US009967034B2

(12) United States Patent
Yuda

(10) Patent No.: US 9,967,034 B2
(45) Date of Patent: May 8, 2018

(54) OPTICAL TRANSCEIVER, OPTICAL NETWORK UNIT, AND OPTICAL TRANSCEIVER CONTROL METHOD

(75) Inventor: Shuitsu Yuda, Osaka-shi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 114 days.

(21) Appl. No.: 13/881,024

(22) PCT Filed: Apr. 4, 2012

(86) PCT No.: PCT/JP2012/059156
§ 371 (c)(1),
(2), (4) Date: Apr. 23, 2013

(87) PCT Pub. No.: WO2013/031278
PCT Pub. Date: Mar. 7, 2013

(65) Prior Publication Data
US 2013/0223848 A1    Aug. 29, 2013

(30) Foreign Application Priority Data

Aug. 31, 2011  (JP) .................................. 2011-188485

(51) Int. Cl.
*H04B 10/00*  (2013.01)
*H04B 10/40*  (2013.01)

(52) U.S. Cl.
CPC .................... *H04B 10/40* (2013.01)

(58) Field of Classification Search
None
See application file for complete search history.

(56) References Cited

U.S. PATENT DOCUMENTS 3,611,141 A   10/1971  Waters
5,095,308 A    3/1992  Hewitt
(Continued)

FOREIGN PATENT DOCUMENTS

JP      5-91057 A    4/1993
JP      6-164497 A   6/1994
(Continued)

OTHER PUBLICATIONS

"Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Std 802.3ah™ 2004 (Amendment to IEEE Std 802.3™-2002 as amended by IEEE Stds 802.3ae™-2002, 802.3af™-2002, 802.3aj™-2003 and 802.3ak™-2004), IEEE Computer Society, pp. 1-623.
(Continued)

*Primary Examiner* — Ken N Vanderpuye
*Assistant Examiner* — David Lambert
(74) *Attorney, Agent, or Firm* — Drinker Biddle & Reath LLP

(57) ABSTRACT

There are provided an optical transceiver, an optical network unit, and an optical transceiver control method that control the operating state of the optical transceiver and reduce the number of terminals of the optical transceiver. An optical transceiver includes: a transmitting and receiving unit that transmits and receives optical signals and that has three or more states for transmission or reception of the optical signals, the states transitioning in sequence; a terminal for receiving a voltage or current as operation instruction information indicating in which one of the states operation is to be performed; and a determining unit for determining one of the states indicated by the operation instruction information,
(Continued)

based on a magnitude of the voltage or current received by the terminal. The transmitting and receiving unit operates in the one of the states determined by the determining unit.

12 Claims, 28 Drawing Sheets

(56) References Cited

U.S. PATENT DOCUMENTS

| | | | |
|---|---|---|---|
| 6,477,205 B1* | 11/2002 | Doblar et al. | 375/259 |
| 6,577,789 B1* | 6/2003 | Wang | H04B 10/2941 |
| | | | 359/341.1 |
| 2002/0046355 A1* | 4/2002 | Takeuchi | 713/320 |
| 2004/0008996 A1* | 1/2004 | Aronson et al. | 398/202 |
| 2010/0111523 A1* | 5/2010 | Hirth et al. | 398/25 |
| 2011/0033193 A1* | 2/2011 | Nakamura | G02F 1/0123 |
| | | | 398/183 |
| 2012/0008937 A1* | 1/2012 | Cheng | H04B 10/671 |
| | | | 398/1 |
| 2012/0166819 A1* | 6/2012 | Skubic et al. | 713/300 |

FOREIGN PATENT DOCUMENTS

| | | |
|---|---|---|
| JP | 2000-278208 A | 10/2000 |
| JP | 2007-013504 A | 1/2007 |

OTHER PUBLICATIONS

National Semiconductor, "DP83843BVJE PHYTER," Jul. 1999.
Delta, "OPGP-34-A4B3SL-B, SFF 2XX10 GPON Class B+ ONU Transceiver 2.488Gbps Downstrean/1.244Gbps Upstream," Delta Electronics, Inc., Oct. 16, 2010.
Iwase, M., et al., "Optical Transceiver Modules for Gigabit Ethernet PON FTTH System," FITEL-Photonics Lab., R&D Div., Furukawa Review, No. 28, 2005.

* cited by examiner

FIG. 5

| BURST ENABLE SIGNAL | L | L | H | H |
|---|---|---|---|---|
| TRANSMIT DISABLE SIGNAL | H | L | L | H |
| TERMINAL VOLTAGE | Vcc | Vcc/2 | 0 | 0 |
| STATE | TRANSMISSION OFF | STANDBY | TRANSMISSION ON | — |

FIG. 8

| BURST ENABLE SIGNAL | L | L | H | H |
|---|---|---|---|---|
| TRANSMIT DISABLE SIGNAL | H | L | L | H |
| TERMINAL VOLTAGE | Vcc | Vcc/2 | 0 | Vcc/2 |
| STATE | TRANSMISSION OFF | STANDBY | TRANSMISSION ON | — |

FIG. 10

| BURST ENABLE SIGNAL | L | L | H | H |
|---|---|---|---|---|
| TRANSMIT DISABLE SIGNAL | H | L | L | H |
| TERMINAL VOLTAGE | Vcc | Vcc/2 | 0 | Vcc/2 |
| STATE | TRANSMISSION OFF | STANDBY | TRANSMISSION ON | — |

FIG. 13

| BURST ENABLE SIGNAL | L | L | L | H | L | H | H |
|---|---|---|---|---|---|---|---|
| TRANSMIT DISABLE SIGNAL | H | H | L | L | L | H | H |
| RECEIVE DISABLE SIGNAL | H | L | L | L | H | L | H |
| TERMINAL VOLTAGE | Vcc | Vcc × 2/3 | Vcc/3 | 0 | Vcc × 2/3 | 0 | 0 |
| STATE | TRANSMISSION/RECEPTION OFF | TRANSMISSION OFF | TRANSMISSION STANDBY | TRANSMISSION/RECEPTION ON | — | — | — |

FIG. 16

| | | | | | | | | |
|---|---|---|---|---|---|---|---|---|
| BURST ENABLE SIGNAL | L | L | L | L | H | H | H | H |
| TRANSMIT DISABLE SIGNAL | H | H | L | L | L | H | L | H |
| RECEIVE DISABLE SIGNAL | H | L | L | L | H | L | H | H |
| TERMINAL VOLTAGE | Vcc | Vcc×2/3 | Vcc/3 | 0 | Vcc×2/3 | Vcc/3 | Vcc/3 | Vcc×2/3 |
| STATE | TRANSMISSION/ RECEPTION OFF | TRANSMISSION/ RECEPTION OFF | TRANSMISSION STANDBY | TRANSMISSION/ RECEPTION ON | – | – | – | – |

FIG. 18

| BURST ENABLE SIGNAL | L | L | L | H | L | H | H |
|---|---|---|---|---|---|---|---|
| TRANSMIT DISABLE SIGNAL | H | H | L | L | L | H | H |
| RECEIVE DISABLE SIGNAL | H | L | L | L | H | L | H |
| TERMINAL VOLTAGE | Vcc | Vcc×2/3 | Vcc/3 | 0 | Vcc×2/3 | Vcc/3 | Vcc×2/3 |
| STATE | TRANSMISSION/ RECEPTION OFF | TRANSMISSION OFF | TRANSMISSION STANDBY | TRANSMISSION/ RECEPTION ON | — | — | — |

FIG. 22

| BURST ENABLE SIGNAL | L | L | L | H | L | H | H |
|---|---|---|---|---|---|---|---|
| TRANSMIT DISABLE SIGNAL | H | H | H | L | L | H | H |
| RECEIVE DISABLE SIGNAL | H | L | L | L | H | L | H |
| TERMINAL VOLTAGE | Vcc | Vcc/2 | 0 | 0 | 0 | Vcc/2 | 0 | Vcc |
| STATE | TRANSMISSION/ RECEPTION OFF | TRANSMISSION OFF | TRANSMISSION STANDBY | TRANSMISSION/ RECEPTION ON | — | — | — | — |

FIG. 25

| BURST ENABLE SIGNAL | L | L | L | H | L | H | H | H |
|---|---|---|---|---|---|---|---|---|
| TRANSMIT DISABLE SIGNAL | H | H | L | L | L | H | L | H |
| RECEIVE DISABLE SIGNAL | H | L | L | L | H | L | H | H |
| TERMINAL VOLTAGE | Vcc | Vcc/2 | 0 | 0 | Vcc/2 | Vcc/2 | Vcc/2 | Vcc |
| STATE | TRANSMISSION/ RECEPTION OFF | TRANSMISSION OFF | TRANSMISSION STANDBY | TRANSMISSION/ RECEPTION ON | — | — | — | — |

FIG. 27

| BURST ENABLE SIGNAL | L | L | L | H | L | H | H |
|---|---|---|---|---|---|---|---|
| TRANSMIT DISABLE SIGNAL | H | H | L | L | L | H | H |
| RECEIVE DISABLE SIGNAL | H | L | L | L | H | L | H |
| TERMINAL VOLTAGE | Vcc | Vcc/2 | 0 | 0 | Vcc/2 | Vcc/2 | Vcc |
| STATE | TRANSMISSION/ RECEPTION OFF | TRANSMISSION/ RECEPTION OFF | TRANSMISSION STANDBY | TRANSMISSION/ RECEPTION ON | — | — | — |

OPTICAL TRANSCEIVER, OPTICAL NETWORK UNIT, AND OPTICAL TRANSCEIVER CONTROL METHOD

TECHNICAL FIELD

The present invention relates to an optical transceiver, an optical network unit, and an optical transceiver control method, and more particularly to an optical transceiver, an optical network unit, and an optical transceiver control method that can perform power saving operation.

BACKGROUND ART

In recent years, the Internet has proliferated widely. Thus, users can access various information on sites run around the world and obtain the information. Accordingly, apparatuses capable of performing broadband access such as ADSL (Asymmetric Digital Subscriber Line) and FTTH (Fiber To The Home) have also been widely used at a rapid pace.

IEEE Std 802.3ah (registered trademark)—2004 (Non-Patent Literature 1) discloses one system of a passive optical network (PON) which is medium-sharing communication where a plurality of optical network units (ONUs) perform data transmission with an optical line terminal (OLT) by sharing an optical communication line. Specifically, there are defined EPON (Ethernet (registered trademark) PON) where all pieces of information including user information passing through the PON and control information for managing and operating the PON are communicated in Ethernet (registered trademark) frame format; and an access control protocol (MPCP (Multi-Point Control Protocol)) and an OAM (Operations Administration and Maintenance) protocol for EPON. By exchanging MPCP frames between the optical line terminal and the optical network units, joining, leaving, and upstream access multiple control of the optical network units, etc., are performed. In addition, Non-Patent Literature 1 describes a new-optical network unit registration method, a report indicating a bandwidth allocation request, and a gate indicating a transmission instruction, by MPCP messages.

Note that even in 10G-EPON which is standardized as IEEE 802.3av (registered trademark)—2009 as the next-generation technology of GE-PON (Giga Bit Ethernet (registered trademark) Passive Optical Network) which is EPON achieving a communication speed of 1 gigabit per second, i.e., EPON whose communication speed is equivalent to 10 gigabits per second, an access control protocol is premised on MPCP.

CITATION LIST

Non-Patent Literature

Non-Patent Literature 1; IEEE Std 802.3ah (registered trademark)—2004

SUMMARY OF INVENTION

Technical Problem

Meanwhile, there is a demand for power saving of ONUs. Thus, there is also a need to achieve power saving of an optical transceiver for transmitting and receiving optical signals which is mounted on an ONU. For this, in the power saving operation of the ONU, it requires to appropriately control the optical transceiver. For example, a configuration is considered in which in order to control the operating state of the optical transceiver, i.e., whether to supply power to each circuit in the optical transceiver, a plurality of control signals are provided to the optical transceiver from the main body side of the ONU.

In addition, there is a demand for miniaturization of ONUs. Thus, there is also a need to achieve miniaturization of an optical transceiver. To achieve miniaturization of an optical transceiver, there is a need to reduce not only the size thereof but also, particularly, the number of connector terminals attached to the optical transceiver.

However, if a plurality of control signals are provided to the optical transceiver to allow the optical transceiver to perform power saving operation, then the number of terminals of the optical transceiver increases, resulting in going against miniaturization.

The present invention is made to solve the above-described problems, and an object of the present invention is to provide an optical transceiver, an optical network unit, and an optical transceiver control method that can control the operating state of the optical transceiver and achieve a reduction in the number of terminals of the optical transceiver.

Solution to Problem

In order to solve the problems, an optical transceiver according to one aspect of the present invention includes: a transmitting and receiving unit that transmits and receives optical signals and that has three or more states for transmission or reception of the optical signals, the states transitioning in sequence; a terminal for receiving a voltage or current as operation instruction information indicating in which one of the states operation is to be performed; and a determining unit for determining one of the states indicated by the operation instruction information, based on a magnitude of the voltage or current received by the terminal, wherein the transmitting and receiving unit operates in the one of the states determined by the determining unit.

By such a configuration, for example, when the operating state of an optical transceiver operable in three states is controlled by two binary control signals, terminals for providing the control signals to the optical transceiver can be integrated into one. In addition, for example, when the operating state of an optical transceiver operable in four states is controlled by three binary control signals, terminals for providing the control signals to the optical transceiver can be integrated into one or two. Therefore, the operating state of the optical transceiver can be controlled and a reduction in the number of terminals of the optical transceiver can be achieved. In addition, since it does not take time to decode the control signals, a reduction in the response rate of the optical transceiver can be prevented.

Preferably, in the transmitting and receiving unit, a transmission-off state, a standby state, and a transmission-on state transition in sequence for transmission of the optical signals.

By such a configuration, a transition of three states of the transmitting unit in the optical transceiver can be controlled, and thus, the upstream frame transmission intervals of each optical network unit can be set to be shorter and the power saving operation of each optical network unit can be minutely set. Therefore, power saving of the optical transceiver can be achieved using a plurality of control signals, and a reduction in the number of terminals of the optical transceiver can be achieved.

More preferably, the transmitting and receiving unit includes: a light-emitting circuit including a light-emitting device; a modulation circuit for supplying a modulation current to the light-emitting device; a first power source that supplies power to the light-emitting circuit and is capable of controlling start and stop of the power supply; and a second power source that supplies power to the modulation circuit and is capable of controlling start and stop of the power supply, wherein in the transmission-off state, the first power source stops power supply to the light-emitting circuit and the second power source stops power supply to the modulation circuit, in the transmission-on state, the first power source supplies power to the light-emitting circuit and the second power source supplies power to the modulation circuit, and in the standby state, the first power source stops power supply to the light-emitting circuit and the second power source supplies power to the modulation circuit.

By such a configuration, a reduction in the number of terminals of the optical transceiver can be achieved and power saving control of each circuit in the transmitting unit in the optical transceiver can be appropriately performed.

More preferably, the transmission-off state, the standby state, and the transmission-on state transition in sequence in this order and in both directions, a voltage received by the terminal as operation instruction information indicating the standby state is an intermediate voltage between voltages received by the terminal as operation instruction information indicating the transmission-on state and the transmission-off state, or a current received by the terminal as operation instruction information indicating the standby state is an intermediate current between currents received by the terminal as operation instruction information indicating the transmission-on state and the transmission-off state.

By such a configuration, the amount of change in voltage or current received by the optical transceiver as operation instruction information, which results from a state transition of the optical transceiver can be reduced, enabling to improve the response rate of the optical transceiver.

Preferably, in the transmitting and receiving unit, a transmission/reception-off state in which transmission operation and reception operation of the optical signals are stopped, a transmission-off state in which transmission operation of the optical signals is stopped and reception operation of the optical signals is performed, a transmission standby state in which transmission of the optical signals is prepared and reception operation of the optical signals is performed, and a transmission/reception-on state in which transmission operation and reception operation of the optical signals are performed, transition in sequence.

By such a configuration, a transition of four states of the transmitting and receiving unit in the optical transceiver can be controlled, and thus, the upstream frame transmission intervals of each optical network unit can be set to be shorter and the power saving operation of each optical network unit can be minutely set. Therefore, power saving of the optical transceiver can be achieved using a plurality of control signals, and a reduction in the number of terminals of the optical transceiver can be achieved.

More preferably, the transmitting and receiving unit includes: a light-emitting circuit including a light-emitting device; a modulation circuit for supplying a modulation current to the light-emitting device; a light-receiving circuit including a light-receiving device; a first power source that supplies power to the light-emitting circuit and is capable of controlling start and stop of the power supply; a second power source that supplies power to the modulation circuit and is capable of controlling start and stop of the power supply; and a third power source that supplies power to the light-receiving circuit and is capable of controlling start and stop of the power supply, wherein in the transmission/reception-off state, the first power source stops power supply to the light-emitting circuit, the second power source stops power supply to the modulation circuit, and the third power source stops power supply to the light-receiving circuit, in the transmission-off state, the first power source stops power supply to the light-emitting circuit, the second power source stops power supply to the modulation circuit, and the third power source supplies power to the light-receiving circuit, in the transmission standby state, the first power source stops power supply to the light-emitting circuit, the second power source supplies power to the modulation circuit, and the third power source supplies power to the light-receiving circuit, and in the transmission/reception-on state, the first power source supplies power to the light-emitting circuit, the second power source supplies power to the modulation circuit, and the third power source supplies power to the light-receiving circuit.

By such a configuration, a reduction in the number of terminals of the optical transceiver can be achieved and power saving control of each circuit in the transmitting and receiving unit in the optical transceiver can be appropriately performed.

More preferably, the transmission/reception-off state, the transmission-off state, the transmission standby state, and the transmission/reception-on state transition in sequence in this order and in both directions, a voltage received by the terminal as operation instruction information indicating the transmission-off state is an intermediate voltage between voltages received by the terminal as operation instruction information indicating the transmission/reception-off state and the transmission standby state or the transmission/reception-on state, or a current received by the terminal as operation instruction information indicating the transmission-off state is an intermediate current between currents received by the terminal as operation instruction information indicating the transmission/reception-off state and the transmission standby state or the transmission/reception-on state.

By such a configuration, the amount of change in voltage or current received by the optical transceiver as operation instruction information, which results from a state transition of the optical transceiver can be reduced, enabling to improve the response rate of the optical transceiver.

In order to solve the problems, an optical network unit according to one aspect of the invention is for transmitting and receiving optical signals to/from an optical line terminal, wherein the optical network unit has: three or more states for transmission or reception of the optical signals, the states transitioning in sequence; and pieces of operation instruction information with which the states are associated in magnitude of a voltage or current such that the transition in sequence exhibits an increase or decrease in voltage or current, and the optical network unit includes: a control unit for determining in which one of the states an optical transceiver is allowed to operate, the optical transceiver performing transmission and reception of the optical signals; and an instructing unit for converting the state determined by the control unit into operation instruction information and providing the operation instruction information to the optical transceiver.

By such a configuration, for example, when the operating state of an optical transceiver operable in three states is controlled by two binary control signals, terminals for providing the control signals to the optical transceiver can be integrated into one. In addition, for example, when the operating state of an optical transceiver operable in four states is controlled by three binary control signals, terminals for providing the control signals to the optical transceiver can be integrated into one or two. Therefore, the operating state of the optical transceiver can be controlled and a reduction in the number of terminals of the optical transceiver can be achieved. In addition, since it does not take time to decode the control signals, a reduction in the response rate of the optical transceiver can be prevented.

Preferably, a transmission-off state, a standby state, and a transmission-on state transition in sequence for transmission of the optical signals.

By such a configuration, a transition of three states of the transmitting unit in the optical transceiver can be controlled, and thus, the upstream frame transmission intervals of each optical network unit can be set to be shorter and the power saving operation of each optical network unit can be minutely set. Therefore, power saving of the optical transceiver can be achieved using a plurality of control signals, and a reduction in the number of terminals of the optical transceiver can be achieved.

More preferably, the transmission-off state, the standby state, and the transmission-on state transition in sequence in this order and in both directions, and the instructing unit outputs: as operation instruction information indicating the standby state, an intermediate voltage between voltages outputted to the optical transceiver as operation instruction information indicating the transmission-on state and the transmission-off state, to the optical transceiver; or as operation instruction information indicating the standby state, an intermediate current between currents outputted to the optical transceiver as operation instruction information indicating the transmission-on state and the transmission-off state, to the optical transceiver.

By such a configuration, the amount of change in voltage or current received by the optical transceiver as operation instruction information, which results from a state transition of the optical transceiver can be reduced, enabling to improve the response rate of the optical transceiver.

Preferably, a transmission/reception-off state in which transmission operation and reception operation of the optical signals are stopped, a transmission-off state in which transmission operation of the optical signals is stopped and reception operation of the optical signals is performed, a transmission standby state in which transmission of the optical signals is prepared and reception operation of the optical signals is performed, and a transmission/reception-on state in which transmission operation and reception operation of the optical signals are performed, transition in sequence.

By such a configuration, a transition of four states of the transmitting and receiving unit in the optical transceiver can be controlled, and thus, the upstream frame transmission intervals of each optical network unit can be set to be shorter and the power saving operation of each optical network unit can be minutely set. Therefore, power saving of the optical transceiver can be achieved using a plurality of control signals, and a reduction in the number of terminals of the optical transceiver can be achieved.

More preferably, the transmission/reception-off state, the transmission-off state, the transmission standby state, and the transmission/reception-on state transition in sequence in this order and in both directions, and the instructing unit outputs: as operation instruction information indicating the transmission-off state, an intermediate voltage between voltages outputted to the optical transceiver as operation instruction information indicating the transmission/reception-off state and the transmission standby state or the transmission/reception-on state, to the optical transceiver; or as operation instruction information indicating the transmission-off state, an intermediate current between currents outputted to the optical transceiver as operation instruction information indicating the transmission/reception-off state and the transmission standby state or the transmission/reception-on state, to the optical transceiver.

By such a configuration, the amount of change in voltage or current received by the optical transceiver as operation instruction information, which results from a state transition of the optical transceiver can be reduced, enabling to improve the response rate of the optical transceiver.

In order to solve the problems, an optical transceiver control method according to one aspect of the invention, is the optical transceiver control method for an optical network unit that transmits and receives optical signals to/from an optical line terminal and that has three or more states for transmission or reception of the optical signals, the states transitioning in sequence, and has pieces of operation instruction information with which the states are associated in magnitude of a voltage or current such that the transition in sequence exhibits an increase or decrease in voltage or current, the method includes the steps of: determining in which one of the states an optical transceiver is allowed to operate, the optical transceiver performing transmission and reception of the optical signals; converting the determined state into operation instruction information and providing the operation instruction information to the optical transceiver; determining one of the states indicated by the operation instruction information, based on a magnitude of a voltage or current received by the optical transceiver as the operation instruction information; and allowing the optical transceiver to operate in the determined one of the states.

By such a configuration, for example, when the operating state of an optical transceiver operable in three states is controlled by two binary control signals, terminals for providing the control signals to the optical transceiver can be integrated into one. In addition, for example, when the operating state of an optical transceiver operable in four states is controlled by three binary control signals, terminals for providing the control signals to the optical transceiver can be integrated into one or two. Therefore, the operating state of the optical transceiver can be controlled and a reduction in the number of terminals of the optical transceiver can be achieved. In addition, since it does not take time to decode the control signals, a reduction in the response rate of the optical transceiver can be prevented.

Advantageous Effects of Invention

According to the present invention, the operating state of an optical transceiver can be controlled and a reduction in the number of terminals of the optical transceiver can be achieved.

BRIEF DESCRIPTION OF DRAWINGS

FIG. 5 is a diagram showing the relationship of the logic levels of the control signals to the optical transceiver, the voltage at a control terminal, and the operating state of the optical transceiver, for the optical network unit according to the first embodiment of the present invention.

FIG. 8 is a diagram showing the relationship of the logic levels of the control signals to the optical transceiver, the voltage at the control terminal, and the operating state of the optical transceiver in the variant shown in FIG. 7.

FIG. 10 is a diagram showing the relationship of the logic levels of the control signals to the optical transceiver, the voltage at the control terminal, and the operating state of the optical transceiver in the variant shown in FIG. 9.

FIG. 13 is a diagram showing the relationship of the logic levels of the control signals to the optical transceiver, the voltage at a control terminal, and the operating state of the optical transceiver, for the optical network unit according to the second embodiment of the present invention.

FIG. 16 is a diagram showing the relationship of the logic levels of the control signals to the optical transceiver, the voltage at a control terminal, and the operating state of the optical transceiver, for the optical network unit according to the second embodiment of the present invention.

FIG. 18 is a diagram showing the relationship of the logic levels of the control signals to the optical transceiver, the voltage at a control terminal, and the operating state of the optical transceiver, for the optical network unit according to the second embodiment of the present invention.

FIG. 22 is a diagram showing the relationship of the logic levels of the control signals to the optical transceiver, the voltage at a control terminal, and the operating state of the optical transceiver, for the optical network unit according to the third embodiment of the present invention.

FIG. 25 is a diagram showing the relationship of the logic levels of the control signals to the optical transceiver, the voltage at the control terminal, and the operating state of the optical transceiver in the variant shown in FIG. 24.

FIG. 27 is a diagram showing the relationship of the logic levels of the control signals to the optical transceiver, the voltage at the control terminal, and the operating state of the optical transceiver in the variant shown in FIG. 26.

DESCRIPTION OF EMBODIMENTS

Figure 1:
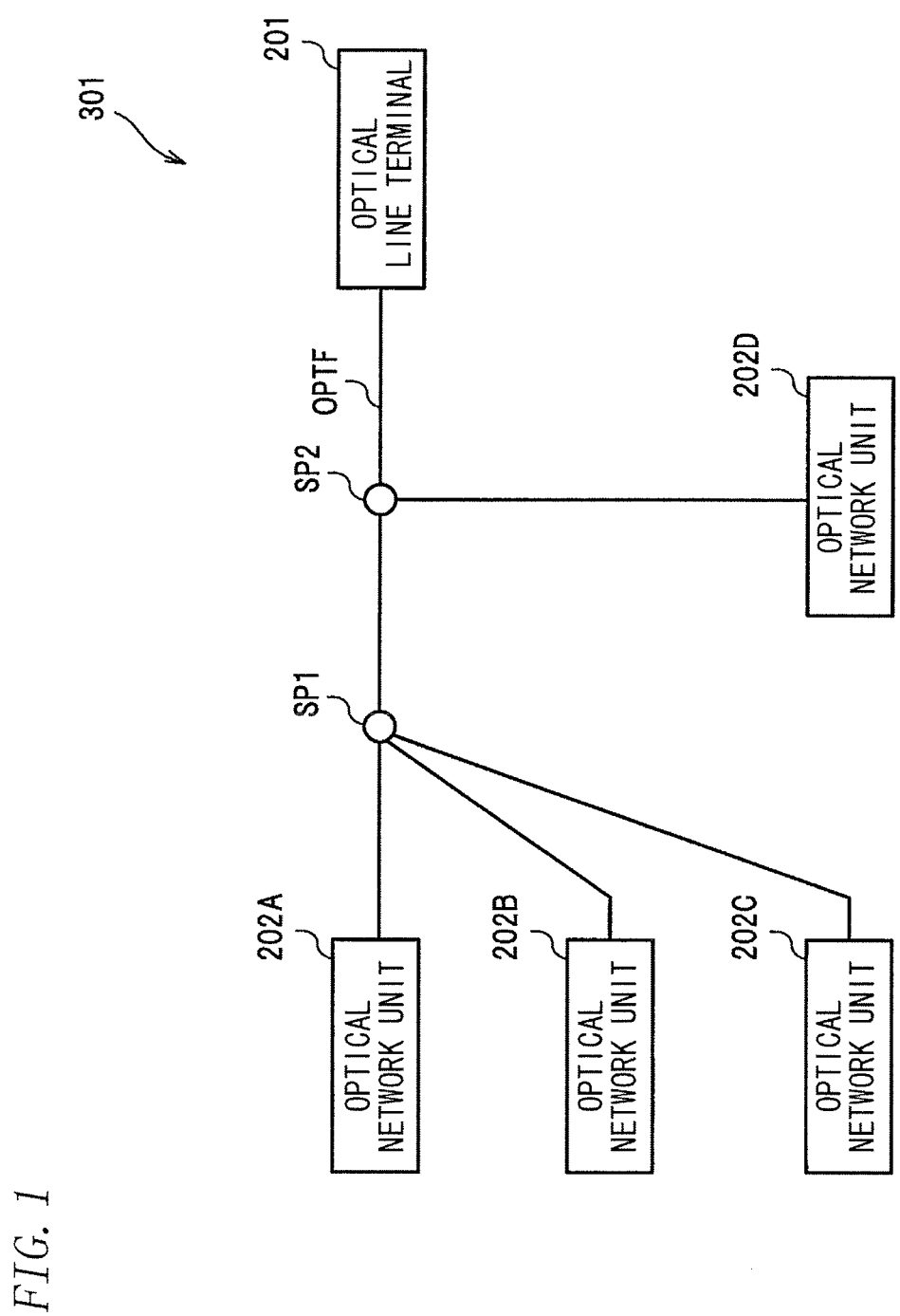
FIG. 1 is a diagram showing a configuration of a PON system according to a first embodiment of the present invention.

Embodiments of the present invention will be described below using the drawings. Note that the same or corresponding portions in the drawings are denoted by the same reference signs and description thereof is not repeated.

First Embodiment

Configuration and Basic Operation

FIG. 1 is a diagram showing a configuration of a PON system according to a first embodiment of the present invention.

Referring to FIG. 1, a PON system 301 is, for example, 10G-EPON and includes optical network units 202A, 202B, 202C, and 202D, an optical line terminal 201, and splitters SP1 and SP2. The optical network units 202A, 202B, and 202C and the optical line terminal 201 are connected to each other through the splitters SP1 and SP2 and an optical fiber OPTF, and transmit and receive optical signals to/from each other. The optical network unit 202D and the optical line terminal 201 are connected to each other through the splitter SP2 and the optical fiber OPTF, and transmit and receive optical signals to/from each other. In the PON system 301, optical signals from the optical network units 202A, 202B, 202C, and 202D to the optical line terminal 201 are time-division multiplexed.

Here, the direction from the ONUs to an upper network is referred to as an upstream direction, and the direction from the upper network to the ONUs is referred to as a downstream direction.

Figure 2:
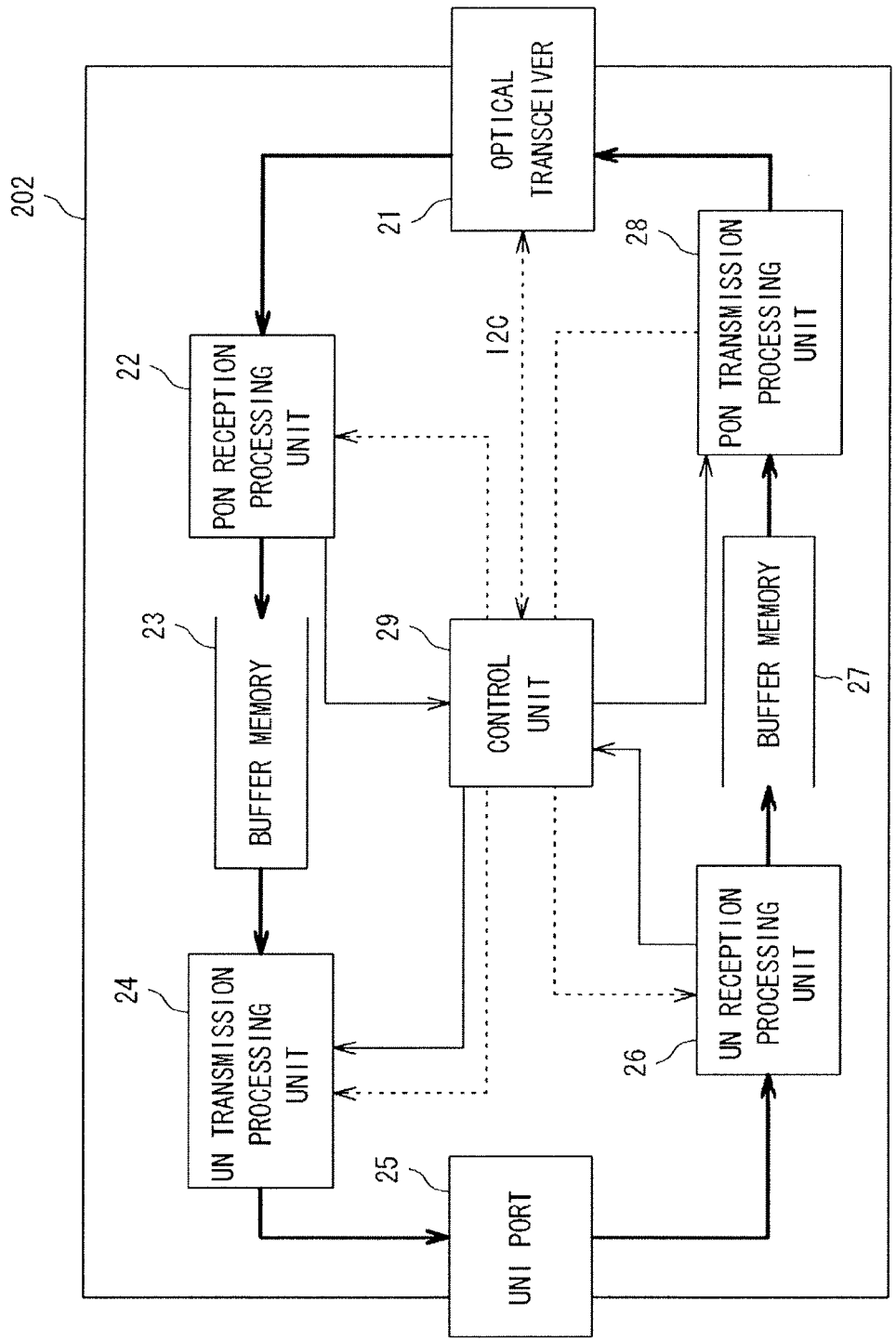
FIG. 2 is a diagram showing a configuration of an optical network unit in the PON system according to the first embodiment of the present invention.

FIG. 2 is a diagram showing a configuration of an optical network unit in the PON system according to the first embodiment of the present invention.

Referring to FIG. 2, an optical network unit 202 includes an optical transceiver 21, a PON reception processing unit 22, a buffer memory 23, a UN transmission processing unit 24, a UNI (User Network Interface) port 25, a UN reception processing unit 26, a buffer memory 27, a PON transmission processing unit 28, and a control unit 29.

The optical transceiver 21 is removable from the optical network unit 202. The optical transceiver 21 operates by, for example, a power supply voltage supplied from the optical network unit 202, with the optical transceiver 21 being mounted on the optical network unit 202. The optical transceiver 21 receives a downstream optical signal transmitted from the optical line terminal 201 and converts the downstream optical signal into an electrical signal and then outputs the electrical signal.

The PON reception processing unit 22 reconstructs a frame from the electrical signal received from the optical transceiver 21 and sorts the frame into the control unit 29 or the UN transmission processing unit 24, according to the type of the frame. Specifically, the PON reception processing unit 22 outputs a data frame to the UN transmission processing unit 24 via the buffer memory 23, and outputs a control frame to the control unit 29.

The control unit 29 generates a control frame including various types of control information and outputs the control frame to the UN transmission processing unit 24.

The UN transmission processing unit 24 transmits, via the UNI port 25, the data frame received from the PON reception processing unit 22 and the control frame received from the control unit 29, to a user terminal such as a personal computer which is not shown.

The UN reception processing unit 26 outputs a data frame received from the user terminal via the UNI port 25, to the PON transmission processing unit 28 via the buffer memory 27, and outputs a control frame received from the user terminal via the UNI port 25, to the control unit 29.

The control unit 29 performs a home-side process pertaining to the control and management of a PON line between the optical line terminal 201 and the optical network unit 202, such as MPCP and OAM. Specifically, by exchanging MPCP messages and OAM messages with the optical line terminal 201 connected to the PON line, various types of control such as access control are performed. The control unit 29 generates a control frame including various types of control information and outputs the control frame to the PON transmission processing unit 28. In addition, the control unit 29 performs various types of setting processes for the respective units in the optical network unit 202.

The PON transmission processing unit 28 outputs the data frame received from the UN reception processing unit 26 and the control frame received from the control unit 29, to the optical transceiver 21.

The optical transceiver 21 converts the data frame and control frame received from the PON transmission processing unit 28, into an optical signal and transmits the optical signal to the optical line terminal 201.

Figure 3:
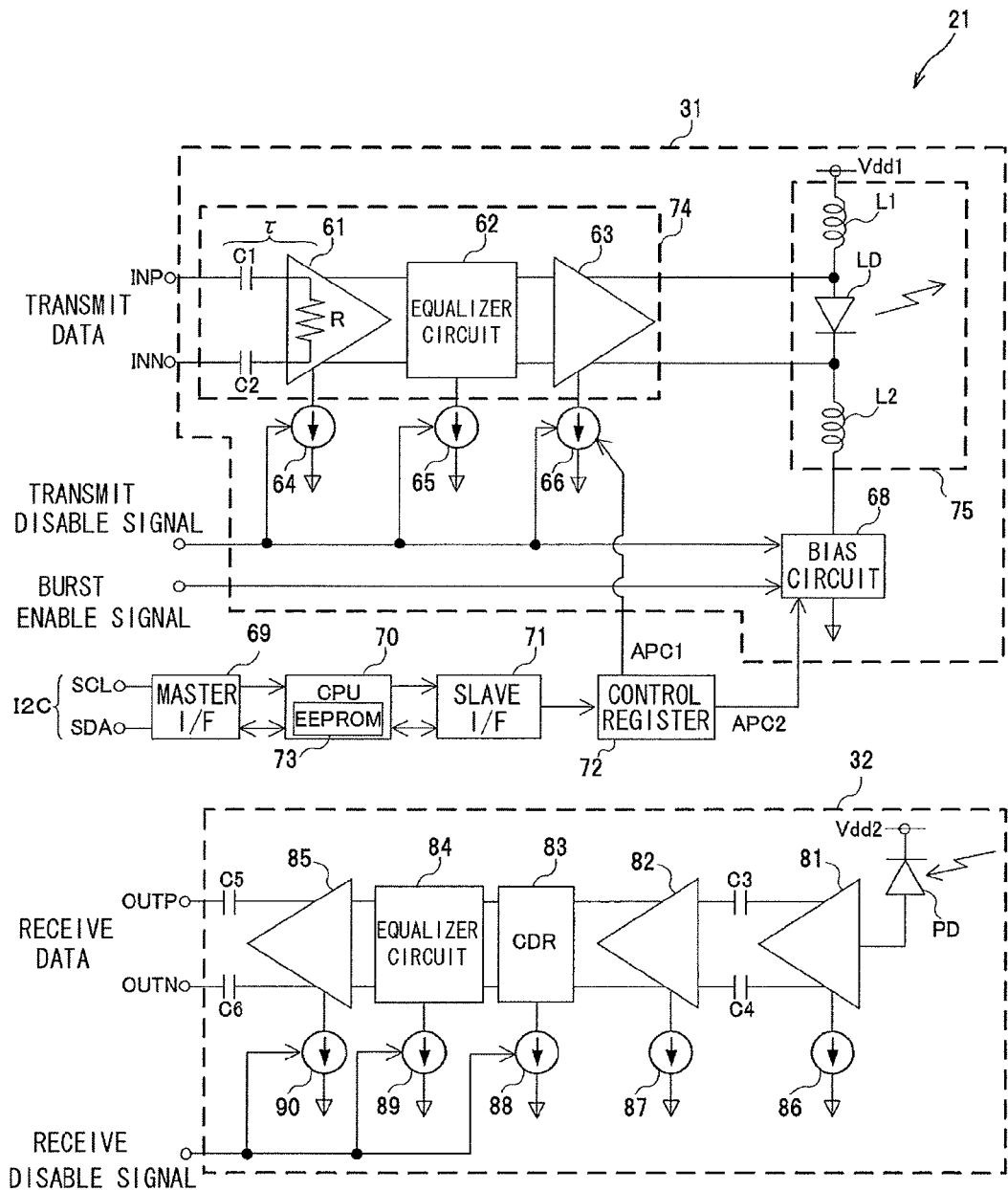
FIG. 3 is a diagram showing a configuration of an optical transceiver in an optical network unit according to the first embodiment of the present invention.

FIG. 3 is a diagram showing a configuration of an optical transceiver in an optical network unit according to the first embodiment of the present invention.

Referring to FIG. 3, the optical transceiver 21 includes a burst transmitting unit 31, a burst receiving unit 32, a master I/F (interface) 69, a CPU (Central Processing Unit) 70, a slave I/F 71, and a control register 72. The burst transmitting unit 31 includes a transmission modulation circuit 74 and a light-emitting circuit 75, as an electric circuit for transmitting optical signals. In addition, the burst transmitting unit 31 includes power sources 64 to 66 and a bias circuit 68. The CPU 70 includes a memory unit 73 which is, for example, an EEPROM (Electrically Erasable Programmable Read Only Memory). The transmission modulation circuit 74 includes a prebuffer circuit 61, an equalizer circuit 62, an output buffer circuit 63, and capacitors C1 and C2. The prebuffer circuit 61 includes a resistor R. The light-emitting circuit 75 includes a light-emitting device LD and inductors L1 and L2.

The burst receiving unit 32 includes a light-receiving device PD, a TIA (Transimpedance Amplifier) 81, an LIA (Limiting Amplifier) 82, a CDR (Clock and Data Recovery) 83, an equalizer circuit 84, an output buffer 85, and capacitors C3 to C6, as a light-receiving circuit which is an electric circuit for receiving optical signals. In addition, the burst receiving unit 32 includes power sources 86 to 90.

In the burst transmitting unit 31, the prebuffer circuit 61 receives, through the capacitors C1 and C2, transmit data which is a data frame from the UN reception processing unit 26 and a control frame from the control unit 29, and amplifies the transmit data and then outputs the amplified transmit data. For example, the prebuffer circuit 61 receives the transmit data through signal lines INP and INN, as balanced signals.

The equalizer circuit 62 performs waveform shaping, e.g., phase distortion correction, on the transmit data received from the prebuffer circuit 61 and outputs the transmit data.

The output buffer circuit 63 supplies modulation currents to the light-emitting circuit 75, based on the transmit data received from the equalizer circuit 62.

The light-emitting circuit 75 transmits an upstream optical signal to the optical line terminal 201. In the light-emitting circuit 75, the light-emitting device LD is connected through the inductor L1 to a power supply node to which a power supply voltage Vdd1 is supplied, and is connected through the inductor L2 to the bias circuit 68. The light-emitting device LD emits light based on a bias current supplied from the bias circuit 68 and the modulation currents supplied from the output buffer circuit 63, and changes light emission intensity.

The power sources 64 to 66 supply, as power, for example, currents to the prebuffer circuit 61, the equalizer circuit 62, and the output buffer circuit 63, respectively, and can control the start and stop of the power supply. More specifically, the power sources 64 to 66 switch whether to supply currents to the prebuffer circuit 61, the equalizer circuit 62, and the output buffer circuit 63, based on a transmit disable signal received from the control unit 29.

The bias circuit 68 supplies, as power, for example, a bias current to the light-emitting circuit 75. In addition, the bias circuit 68 switches whether to supply a bias current to the light-emitting circuit 75, based on the transmit disable signal and a burst enable signal which are received from the control unit 29.

Specifically, the power sources 64 to 66 supply power to the prebuffer circuit 61, the equalizer circuit 62, and the output buffer circuit 63 when the transmit disable signal is deactivated, and stop the power supply when the transmit disable signal is activated.

The bias circuit 68 supplies power to the light-emitting circuit 75 when the transmit disable signal is deactivated and the burst enable signal is activated, and stops the power supply to the light-emitting circuit 75 otherwise.

The CPU 70 exchanges various types of data with the control unit 29 via, for example, an I2C bus including a signal line SCL and a signal line SDA.

The master I/F 69 provides an interface function between the CPU 70 and the I2C bus.

The slave I/F 71 provides an interface function between the CPU 70 and the control register 72.

The CPU 70 writes various control data in the control register 72 through the slave I/F 71.

The memory unit 73 in the CPU 70 stores the response time of each of the prebuffer circuit 61, the equalizer circuit 62, the output buffer circuit 63, and the light-emitting circuit 75, with respect to the start and stop of power supply. For example, the response time is the sum of a startup time from when each of the prebuffer circuit 61, the equalizer circuit 62, the output buffer circuit 63, and the light-emitting circuit 75 receives power supply from its corresponding power source or the bias circuit 68 until starting operation, and a shutdown time from when the power supply is stopped until stopping the operation.

In the burst transmitting unit 31, of the prebuffer circuit 61, the equalizer circuit 62, the output buffer circuit 63, and the light-emitting circuit 75, the prebuffer circuit 61 has the slowest response. The startup time of the prebuffer circuit 61 is a time constant τ of the capacitors C1 and C2 for AC coupling and the terminating resistor R.

The power source 66 changes the amount of current supplied to the output buffer circuit 63, based on control data APC1 written in the control register 72.

The bias circuit 68 changes the amount of current supplied to the light-emitting circuit 75, based on control data APC2 written in the control register 72.

In the burst receiving unit 32, the light-receiving device PD converts an optical signal received from the optical line terminal 201 into a current and outputs the current.

The TIA 81 converts the current received from the light-receiving device PD into voltages and outputs the voltages to the LIA 82 via the capacitors C3 and C4.

The LIA 82 binarizes the levels of the voltages received from the TIA 81 and outputs the binarized levels as receive data.

The CDR 83 reshapes the receive data received from the LIA 82 and extracts timing from the receive data and performs retiming on the receive data based on the extracted timing, thereby establishing synchronization with the optical line terminal 201.

The equalizer circuit 84 performs waveform shaping, e.g., phase distortion correction, on the receive data received from the CDR 83 and outputs the receive data.

The output buffer 85 amplifies the receive data received from the equalizer circuit 84 and outputs the amplified receive data to the PON reception processing unit 22 through the capacitors C5 and C6. For example, the output buffer 85 outputs the receive data through signal lines OUTP and OUTN, as balanced signals.

The power sources 86 to 90 supply, as power, for example, currents to the TIA 81, the LIA 82, the CDR 83, the equalizer circuit 84, and the output buffer 85, respectively. In addition, the power sources 88 to 90 can control the start and stop of the power supply. More specifically, the power sources 88 to 90 switch whether to supply currents to the CDR 83, the equalizer circuit 84, the output buffer 85, based on a receive disable signal received from the control unit 29.

Specifically, the power sources 88 to 90 supply power to the CDR 83, the equalizer circuit 84, and the output buffer 85 when the receive disable signal is deactivated, and stop the power supply when the receive disable signal is activated.

Each of the power sources 64, 65, and 66, the bias circuit 68, and the power sources 88, 89, and 90 may be hereinafter simply referred to as a "power source".

The memory unit 73 in the CPU 70 stores the response time of each of the CDR 83, the equalizer circuit 84, and the output buffer 85, with respect to the start and stop of power supply. For example, the response time is the sum of a startup time from when each of the CDR 83, the equalizer circuit 84, and the output buffer 85 receives power supply from its corresponding power source until starting operation, and a shutdown time from when the power supply is stopped until stopping the operation.

In the burst receiving unit 32, of the CDR 83, the equalizer circuit 84, and the output buffer 85, the CDR 83 has the slowest response. The startup time of the CDR 83 is the lock time of a PLL (Phase Locked Loop) circuit in the CDR 83.

In the optical transceiver 21, in order to speed up the lock time of the PLL circuit in the CDR 83, the power sources 86 and 87 do not perform control to stop power supply to the TIA 81 and the LIA 82. However, for example, when the CDR 83 is not provided in the optical transceiver 21, the start and stop of power supply to the TIA 81 and the LIA 82 can be controlled by outputting a receive disable signal to the power sources 86 and 87.

The optical transceiver 21 is operable in three or more states for the transmission or reception of optical signals, by a plurality of control signals from the control unit 29, and the states transition in sequence, i.e., in series. For example, the burst transmitting unit 31 in the optical transceiver 21 is operable in a transmission-off state, a standby state, and a transmission-on state for transmission of optical signals, and the transmission-off state, the standby state, and the transmission-on state transition in sequence.

The control unit 29 generates control signals that control in which one of the above-described states the optical transceiver 21 is allowed to operate, e.g., a plurality of control signals that control whether to supply power to an optical signal transmitting unit in the optical transceiver 21.

Specifically, in the transmission-off state, the bias circuit 68 stops power supply to the light-emitting circuit 75, and the power sources 64 to 66 stop power supply to the transmission modulation circuit 74.

In the transmission-on state, the bias circuit 68 supplies power to the light-emitting circuit 75, and the power sources 64 to 66 supply power to the transmission modulation circuit 74.

In the standby state, the bias circuit 68 stops power supply to the light-emitting circuit 75, and the power sources 64 to 66 supply power to the transmission modulation circuit 74.

Figure 4:
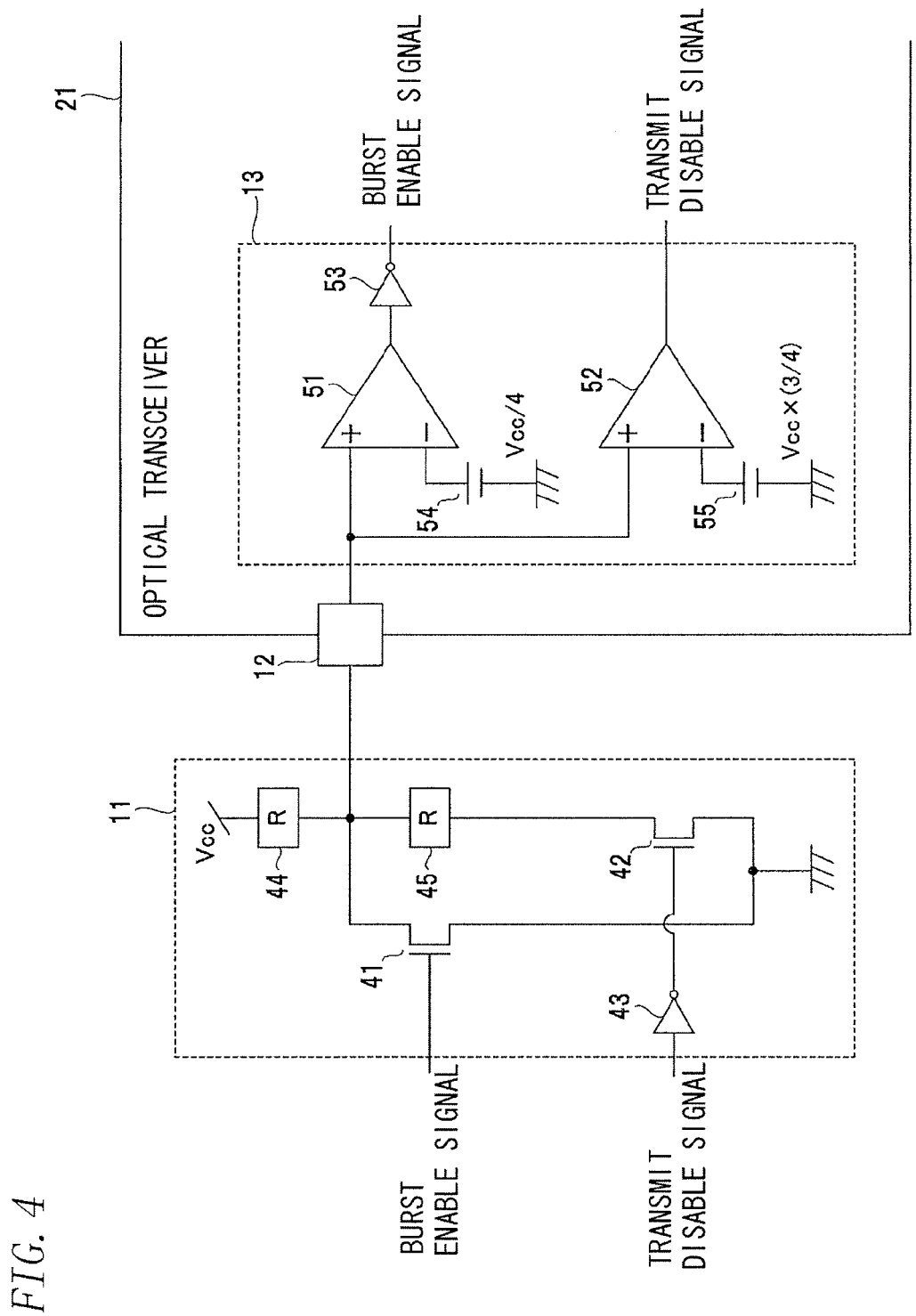
FIG. 4 is a diagram showing a configuration of transmission of control signals to the optical transceiver in the optical network unit according to the first embodiment of the present invention.

FIG. 4 is a diagram showing a configuration of transmission of control signals to the optical transceiver in the optical network unit according to the first embodiment of the present invention.

Referring to FIG. 4, the optical network unit 202 further includes an instructing unit 11. The instructing unit 11 includes N-channel MOS transistors 41 and 42, an inverter 43, and resistors 44 and 45. The optical transceiver 21 further includes a control terminal 12 and a determining unit 13. The determining unit 13 includes operational amplifiers 51 and 52, an inverter 53, and constant voltage sources 54 and 55.

The instructing unit 11 converts the control contents of a plurality of control signals generated by the control unit 29 into one of the transmission-off state, the standby state, and the transmission-on state, and outputs a voltage with a magnitude corresponding to the converted state to the control terminal 12 of the optical transceiver 21, as operation instruction information. Namely, the control terminal 12 receives the voltage as operation instruction information indicating in which one of the above-described states operation is to be performed.

The determining unit 13 determines one of the above-described states that is indicated by the operation instruction information, based on the magnitude of the voltage received by the control terminal 12. The burst transmitting unit 31 in the optical transceiver 21 operates in the one of the above-described states determined by the determining unit 13.

More specifically, in the instructing unit 11, the resistor 44 has a first end connected to a node to which a power supply voltage Vcc is supplied; and a second end connected to the control terminal 12 of the optical transceiver 21. The resistor 45 has a first end connected to the second end of the resistor 44; and a second end. The N-channel MOS transistor 41 has a gate that receives a burst enable signal transmitted from the control unit 29; a drain connected to the control terminal 12 of the optical transceiver 21; and a source connected to a ground node to which a ground voltage is supplied. The N-channel MOS transistor 42 has a gate that receives, via the inverter 43, a transmit disable signal transmitted from the control unit 29; a drain connected to the second end of the resistor 45; and a source connected to the ground node to which a ground voltage is supplied. The inverter 43 inverts the logic level of the transmit disable signal received from the control unit 29 and outputs the transmit disable signal. Here, the resistance values of the resistors 44 and 45 are R. The power supply voltage Vcc is smaller in the absolute value of voltage level than, for example, power supply voltages Vdd1 and Vdd2.

In the determining unit 13, the operational amplifier 51 has a non-inverting input terminal connected to the control terminal 12; an inverting input terminal that receives a voltage of Vcc/4 from the constant voltage source 54; and an output terminal. The operational amplifier 52 has a non-inverting input terminal connected to the control terminal 12; an inverting input terminal that receives a voltage of (Vcc×¾) from the constant voltage source 55; and an output terminal.

The operational amplifier 51 outputs a logic high level signal when the voltage at the non-inverting input terminal is higher than the voltage at the inverting input terminal, and outputs a logic low level signal when the voltage at the non-inverting input terminal is lower than the voltage at the inverting input terminal.

The inverter 53 inverts the logic level of the signal received from the operational amplifier 51 and outputs the signal as a burst enable signal.

The operational amplifier 52 outputs a logic high level signal as a transmit disable signal when the voltage at the non-inverting input terminal is higher than the voltage at the inverting input terminal, and outputs a logic low level signal as a transmit disable signal when the voltage at the non-inverting input terminal is lower than the voltage at the inverting input terminal.

FIG. 5 is a diagram showing the relationship of the logic levels of the control signals to the optical transceiver, the voltage at the control terminal, and the operating state of the optical transceiver, for the optical network unit according to the first embodiment of the present invention.

Referring to FIG. 5, when the burst enable signal is at a logic low level and the transmit disable signal is at a logic high level, the N-channel MOS transistors 41 and 42 are turned off. By this, the voltage at the control terminal 12 reaches Vcc.

At this time, in the determining unit 13, a burst enable signal of a logic low level is outputted from the inverter 53, and a transmit disable signal of a logic high level is outputted from the operational amplifier 52. By this, the optical transceiver 21 is placed in a transmission-off state.

When the burst enable signal is at a logic low level and the transmit disable signal is at a logic low level, the N-channel MOS transistor 41 is turned off and the N-channel MOS transistor 42 is turned on. By this, the voltage at the control terminal 12 reaches Vcc/2.

At this time, in the determining unit 13, a burst enable signal of a logic low level is outputted from the inverter 53, and a transmit disable signal of a logic low level is outputted from the operational amplifier 52. By this, the optical transceiver 21 is placed in a transmission standby state.

When the burst enable signal is at a logic high level and the transmit disable signal is at a logic low level, the N-channel MOS transistor 41 is turned on and the N-channel MOS transistor 42 is turned on. By this, the voltage at the control terminal 12 reaches zero.

At this time, in the determining unit 13, a burst enable signal of a logic high level is outputted from the inverter 53, and a transmit disable signal of a logic low level is outputted from the operational amplifier 52. By this, the optical transceiver 21 is placed in a transmission-on state.

When the burst enable signal is at a logic high level and the transmit disable signal is at a logic high level, the voltage at the control terminal 12 reaches zero, as in the case in which the burst enable signal is at a logic high level and the transmit disable signal is at a logic low level. However, in the PON system 301, the control signals are not placed in such a state and thus it is unavailable operation.

Namely, the optical network unit according to the first embodiment of the present invention treats such a state as unavailable operation, thereby achieving a reduction in the number of terminals.

As such, the instructing unit 11 outputs, as operation instruction information indicating the standby state, Vcc/2 which is an intermediate voltage between a ground voltage outputted to the optical transceiver 21 as operation instruction information indicating the transmission-on state and a voltage Vcc outputted to the optical transceiver 21 as operation instruction information indicating the transmission-off state, to the optical transceiver 21.

Namely, the voltage received by the control terminal 12 as operation instruction information indicating the standby state is an intermediate voltage between a voltage received by the control terminal 12 as operation instruction information indicating the transmission-on state and a voltage received by the control terminal 12 as operation instruction information indicating the transmission-off state.

Figure 6:
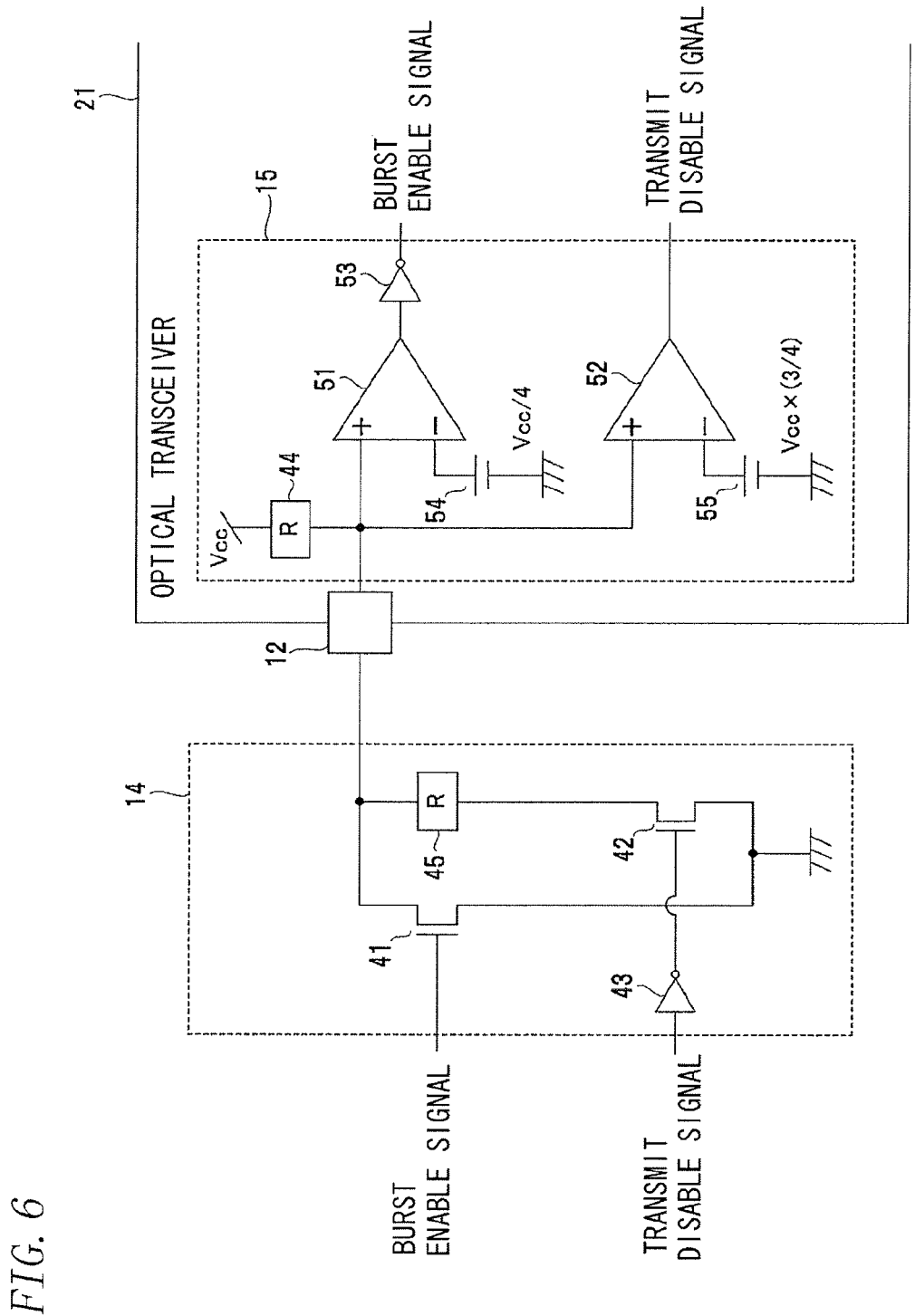
FIG. 6 is a diagram showing a variant of the configuration of transmission of control signals to the optical transceiver in the optical network unit according to the first embodiment of the present invention.

FIG. 6 is a diagram showing a variant of the configuration of transmission of control signals to the optical transceiver in the optical network unit according to the first embodiment of the present invention. Details other than those described below are the same as those of the configuration shown in FIG. 4.

Referring to FIG. 6, the optical network unit 202 includes an instructing unit 14 instead of the instructing unit 11. The instructing unit 14 includes N-channel MOS transistors 41 and 42, an inverter 43, and a resistor 45. The optical transceiver 21 includes a determining unit 15 instead of the determining unit 13. The determining unit 15 includes a resistor 44, operational amplifiers 51 and 52, an inverter 53, and constant voltage sources 54 and 55.

In the instructing unit 14, the resistor 45 has a first end connected to the control terminal 12 of the optical transceiver 21; and a second end connected to a drain of the N-channel MOS transistor 42.

In the determining unit 15, the resistor 44 has a first end connected to a node to which a power supply voltage Vcc is supplied; and a second end connected to the control terminal 12 of the optical transceiver 21.

In the variant, the instructing unit 14 converts the control contents of a plurality of control signals generated by the control unit 29 into one of the states of the optical transceiver 21, and outputs a current with a magnitude corresponding to the converted state to the control terminal 12 of the optical transceiver 21, as operation instruction information. Namely, the control terminal 12 receives the current as operation instruction information indicating in which one of the above-described states operation is to be performed.

The determining unit 15 determines one of the above-described states that is indicated by the operation instruction information, based on the magnitude of the current received by the control terminal 12.

The burst transmitting unit 31 in the optical transceiver 21 operates in the one of the above-described states determined by the determining unit 15.

Note that the relationship of the logic levels of the control signals to the optical transceiver, the voltage at the control terminal, and the operating state of the optical transceiver in the variant is the same as that in FIG. 5.

Specifically, the instructing unit 14 outputs, as operation instruction information indicating the standby state, an intermediate current between a current outputted to the optical transceiver 21 as operation instruction information indicating the transmission-on state and a current outputted to the optical transceiver 21 as operation instruction information indicating the transmission-off state, to the optical transceiver 21.

In other words, the current received by the control terminal 12 as operation instruction information indicating the standby state is an intermediate current between a current received by the control terminal 12 as operation instruction information indicating the transmission-on state and a current received by the control terminal 12 as operation instruction information indicating the transmission-off state.

Figure 7:
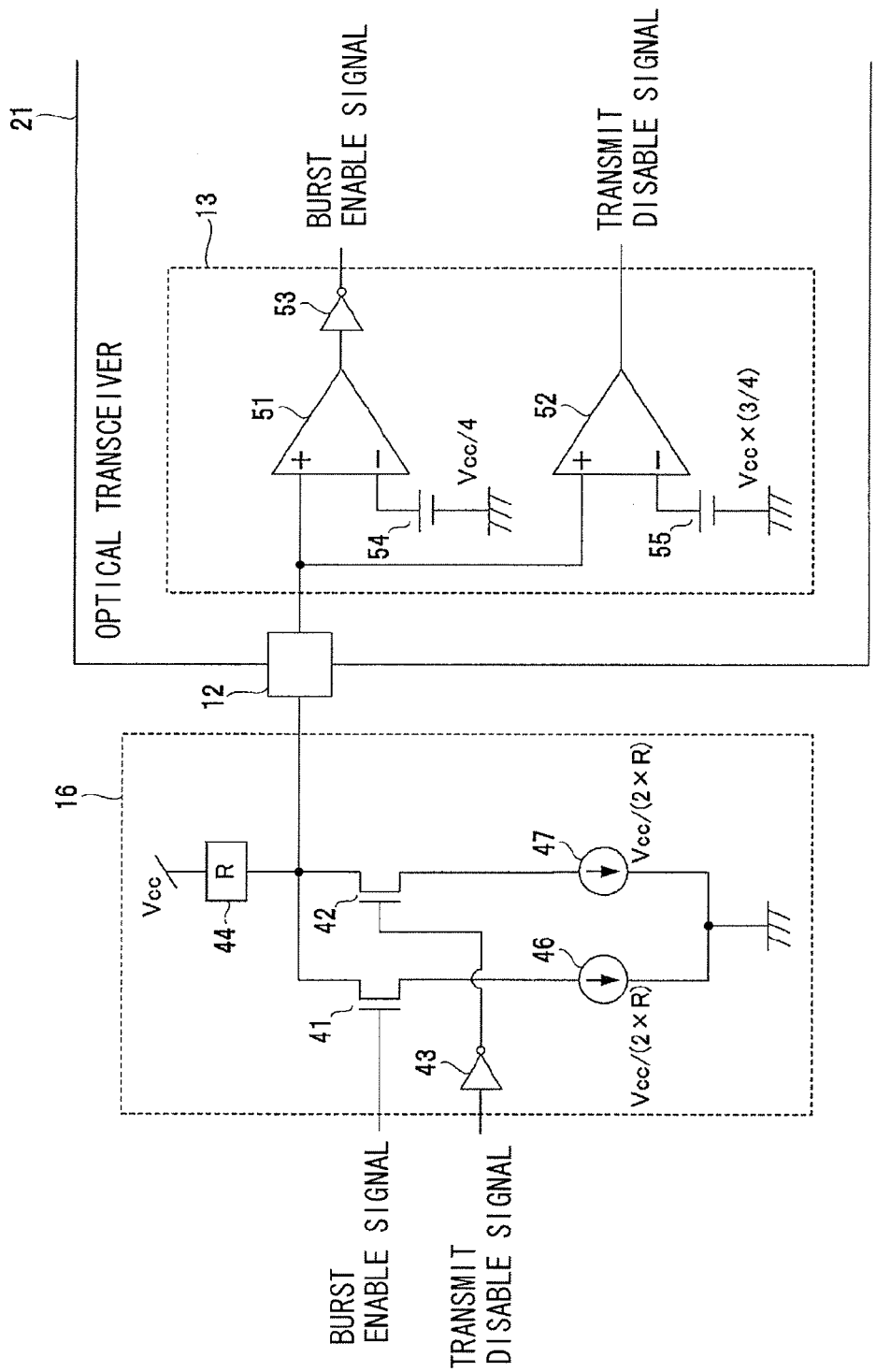
FIG. 7 is a diagram showing a variant of the configuration of transmission of control signals to the optical transceiver in the optical network unit according to the first embodiment of the present invention.

FIG. 7 is a diagram showing a variant of the configuration of transmission of control signals to the optical transceiver in the optical network unit according to the first embodiment of the present invention. Details other than those described below are the same as those of the configuration shown in FIG. 4.

Referring to FIG. 7, the optical network unit 202 includes an instructing unit 16 instead of the instructing unit 11. The instructing unit 16 includes N-channel MOS transistors 41 and 42, an inverter 43, a resistor 44, and constant current sources 46 and 47.

In the instructing unit 16, the resistor 44 has a first end connected to a node to which a power supply voltage Vcc is supplied; and a second end connected to the control terminal 12 of the optical transceiver 21. The N-channel MOS transistor 41 has a gate that receives a burst enable signal transmitted from the control unit 29; a drain connected to the control terminal 12 of the optical transceiver 21; and a source connected to a first end of the constant current source 46. The N-channel MOS transistor 42 has a gate that receives, via the inverter 43, a transmit disable signal transmitted from the control unit 29; a drain connected to the control terminal 12 of the optical transceiver 21; and a source connected to a first end of the constant current source 47. Second ends of the constant current sources 46 and 47 are connected to a ground node to which a ground voltage is supplied. The inverter 43 inverts the logic level of the transmit disable signal received from the control unit 29 and outputs the transmit disable signal. Here, the constant current sources 46 and 47 each output a current of Vcc/(2×R).

FIG. 8 is a diagram showing the relationship of the logic levels of the control signals to the optical transceiver, the voltage at the control terminal, and the operating state of the optical transceiver in the variant shown in FIG. 7.

Referring to FIG. 8, when the burst enable signal is at a logic low level and the transmit disable signal is at a logic high level, the N-channel MOS transistors 41 and 42 are turned off. By this, the voltage at the control terminal 12 reaches Vcc.

At this time, in the determining unit 13, a burst enable signal of a logic low level is outputted from the inverter 53, and a transmit disable signal of a logic high level is outputted from the operational amplifier 52. By this, the optical transceiver 21 is placed in a transmission-off state.

When the burst enable signal is at a logic low level and the transmit disable signal is at a logic low level, the N-channel MOS transistor 41 is turned off and the N-channel MOS transistor 42 is turned on, whereby the constant current source 47 outputs a current. By this, the voltage at the control terminal 12 reaches Vcc/2.

At this time, in the determining unit 13, a burst enable signal of a logic low level is outputted from the inverter 53, and a transmit disable signal of a logic low level is outputted from the operational amplifier 52. By this, the optical transceiver 21 is placed in a transmission standby state.

When the burst enable signal is at a logic high level and the transmit disable signal is at a logic low level, the N-channel MOS transistor 41 is turned on, whereby the constant current source 46 outputs a current, and the N-channel MOS transistor 42 is turned on, whereby the constant current source 47 outputs a current. By this, the voltage at the control terminal 12 reaches zero.

At this time, in the determining unit 13, a burst enable signal of a logic high level is outputted from the inverter 53, and a transmit disable signal of a logic low level is outputted from the operational amplifier 52. By this, the optical transceiver 21 is placed in a transmission-on state.

When the burst enable signal is at a logic high level and the transmit disable signal is at a logic high level, the voltage at the control terminal 12 reaches Vcc/2, as in the case in which the burst enable signal is at a logic low level and the transmit disable signal is at a logic low level. However, in the PON system 301, the control signals are not placed in such a state and thus it is unavailable operation.

Note that in the configuration shown in FIG. 7, too, as with the configuration shown in FIG. 6, the resistor 44 can be provided on the side of the optical transceiver 21.

Figure 9:
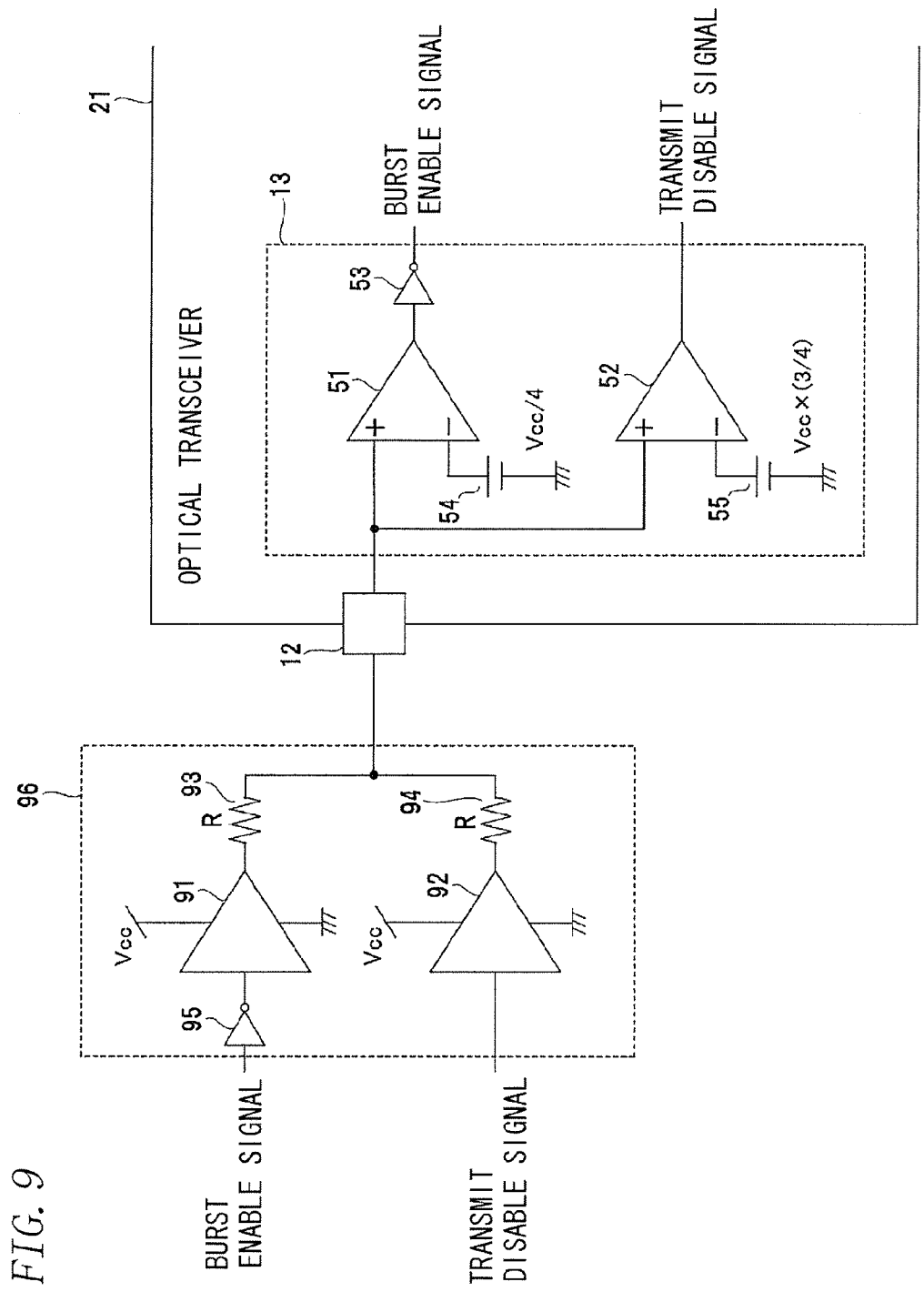
FIG. 9 is a diagram showing a variant of the configuration of transmission of control signals to the optical transceiver in the optical network unit according to the first embodiment of the present invention.

FIG. 9 is a diagram showing a variant of the configuration of transmission of control signals to the optical transceiver in the optical network unit according to the first embodiment of the present invention. Details other than those described below are the same as those of the configuration shown in FIG. 4.

Referring to FIG. 9, the optical network unit 202 includes an instructing unit 96 instead of the instructing unit 11. The instructing unit 96 includes buffers 91 and 92, resistors 93 and 94, and an inverter 95.

The resistor 93 has a first end connected to an output terminal of the buffer 91; and a second end connected to the control terminal 12. The resistor 94 has a first end connected to an output terminal of the buffer 92; and a second end connected to the control terminal 12.

The buffers 91 and 92 are, for example, CMOS (Complementary Metal Oxide Semiconductor) push-pull buffers. Here, the resistance values of the resistors 93 and 94 are R.

The inverter 95 inverts the logic level of a burst enable signal received from the control unit 29 and outputs the burst enable signal to the buffer 91. The buffer 92 receives a transmit disable signal from the control unit 29.

FIG. 10 is a diagram showing the relationship of the logic levels of the control signals to the optical transceiver, the voltage at the control terminal, and the operating state of the optical transceiver in the variant shown in FIG. 9.

Referring to FIG. 10, when the burst enable signal is at a logic low level and the transmit disable signal is at a logic high level, the output from the buffer 91 goes to a logic high level and the output from the buffer 92 goes to a logic high level. By this, the voltage at the control terminal 12 reaches Vcc.

At this time, in the determining unit 13, a burst enable signal of a logic low level is outputted from the inverter 53, and a transmit disable signal of a logic high level is outputted from the operational amplifier 52. By this, the optical transceiver 21 is placed in a transmission-off state.

When the burst enable signal is at a logic low level and the transmit disable signal is at a logic low level, the output from the buffer 91 goes to a logic high level and the output from the buffer 92 goes to a logic low level. By this, the voltage at the control terminal 12 reaches Vcc/2.

At this time, in the determining unit 13, a burst enable signal of a logic low level is outputted from the inverter 53, and a transmit disable signal of a logic low level is outputted from the operational amplifier 52. By this, the optical transceiver 21 is placed in a transmission standby state.

When the burst enable signal is at a logic high level and the transmit disable signal is at a logic low level, the output from the buffer 91 goes to a logic low level and the output from the buffer 92 goes to a logic low level. By this, the voltage at the control terminal 12 reaches zero.

At this time, in the determining unit 13, a burst enable signal of a logic high level is outputted from the inverter 53, and a transmit disable signal of a logic low level is outputted from the operational amplifier 52. By this, the optical transceiver 21 is placed in a transmission-on state.

When the burst enable signal is at a logic high level and the transmit disable signal is at a logic high level, the voltage at the control terminal 12 reaches Vcc/2, as in the case in which the burst enable signal is at a logic low level and the transmit disable signal is at a logic low level. However, in the PON system 301, the control signals are not placed in such a state and thus it is unavailable operation.

As such, by the configuration using CMOS push-pull buffers, for example, the responsivity upon turn-off can be increased, compared to the configuration using N-channel MOS transistors such as that shown in FIG. 4, etc.

[Operation]

Next, the power saving operation of the optical network unit according to the first embodiment of the present invention will be described using the drawings.

Figure 11:
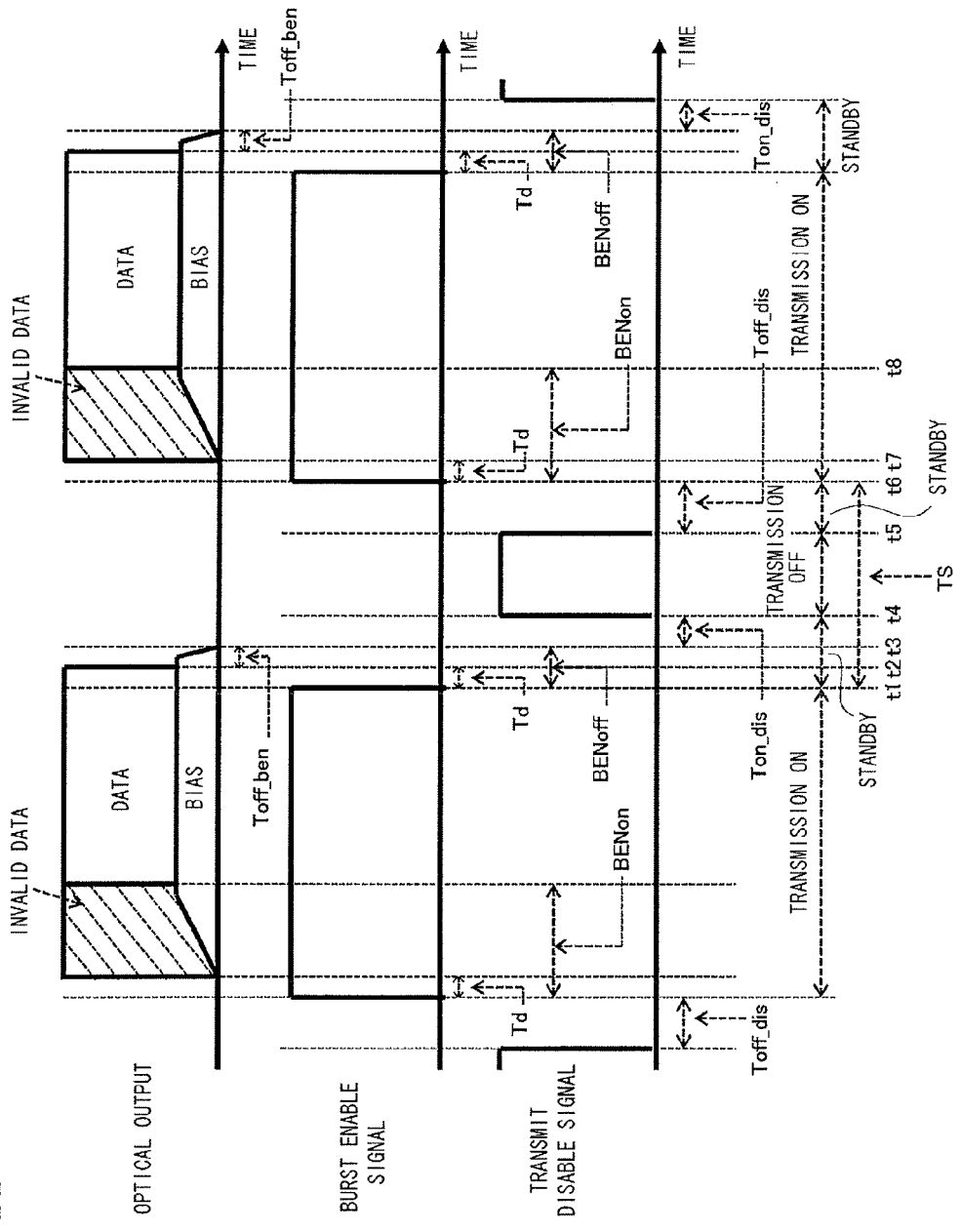
FIG. 11 is a diagram showing an example of the switching timing of an optical output and control signals for a burst transmitting unit in the optical transceiver according to the first embodiment of the present invention.

FIG. 11 is a diagram showing an example of the switching timing of an optical output and control signals for the burst transmitting unit in the optical transceiver according to the first embodiment of the present invention.

Referring to FIG. 11, a burst enable signal is deactivated in accordance with the timing at which transmission of burst data is completed (timing t1). Then, after a lapse of transmission delay time Td of the burst enable signal, a bias current starts to decrease (timing t2). After a lapse of time Toff_ben, the bias current becomes zero (timing t3). By this, a current supply to the light-emitting circuit 75 is stopped.

Next, after a lapse of time Ton_dis from timing t3 at which the bias current becomes zero, a transmit disable signal is activated (timing t4). By this, a current supply to the transmission modulation circuit 74 is stopped.

Next, the transmit disable signal is deactivated and modulation current supply starts (timing t5).

Then, after a lapse of time Toff_rbs, the burst enable signal is activated (timing t6). By the time Toff_dis, the startup time of the transmission modulation circuit 74 is secured.

Then, after a lapse of transmission delay time Td of the burst enable signal from timing t6, the bias current starts to flow and invalid data starts to be transmitted (timing t7).

Next, the bias current is stabilized a little bit before timing t8 which is the timing at which transmission of burst data starts. Then, at timing t8, transmission of valid data starts.

In this example, the period from timing t1 to timing t4 corresponds to the standby state, the period from timing t4 to timing t5 corresponds to the transmission-off state, the period from timing t5 to timing t6 corresponds to the standby state, and the period from timing t6 through timing t8 to the timing at which transmission of the next burst data is completed corresponds to the transmission-on state.

As such, in the optical transceiver 21, the transmission-off state, the standby state, and the transmission-on state transition in sequence in this order and in both directions. Namely, the transmission-off state and the transmission-on state transition via the standby state. In the examples shown in FIGS. 4, 6, and 7, the magnitude of a voltage or current received by the control terminal 12 when operation instruction information indicates each of the transmission-off state, the standby state, and the transmission-on state, changes in this order in a stepwise manner.

In addition, in FIG. 11, time BENoff from timing t1 to timing t3 corresponds to the shutdown time of the light-emitting circuit 75, time BENon from timing t6 to timing t8 corresponds to the startup time of the light-emitting circuit 75, and (time BENoff+time BENon) corresponds to the response time T1 of the light-emitting circuit 75.

Time Ton_dis from timing t3 to timing t4 corresponds to the shutdown time of the transmission modulation circuit 74, time Toff_dis from timing t5 to timing t6 corresponds to the startup time of the transmission modulation circuit 74, and (time Ton_dis+time Toff_dis) corresponds to the response time T2 of the transmission modulation circuit 74.

Meanwhile, if a plurality of control signals are provided to the optical transceiver to allow the optical transceiver to perform, for example, power saving operation, then the number of terminals of the optical transceiver increases, resulting in going against miniaturization.

By outputting serial data instead of a plurality of control signals to the optical transceiver 21, the number of terminals of the optical transceiver 21 can be reduced. However, in such a configuration, it takes time to decode the serial data, resulting in a reduction in the response rate of the optical transceiver 21.

On the other hand, in the optical transceiver according to the first embodiment of the present invention, the burst transmitting unit 31 is operable in three or more states for transmission of optical signals, and the states transition in sequence. The control terminal 12 receives a voltage or current as operation instruction information indicating in which one of the states operation is to be performed. The determining unit 13 determines one of the states that is indicated by the operation instruction information, based on the magnitude of the voltage or current received by the control terminal 12. Then, the burst transmitting unit 31 operates in the one of the states determined by the determining unit 13.

In addition, in the optical network unit according to the first embodiment of the present invention, the control unit 29 generates a plurality of control signals that control in which one of the above-described states the optical transceiver 21 is allowed to operate. The instructing unit 11 converts the control contents of the plurality of control signals generated by the control unit 29 into one of the above-described states, and outputs a voltage or current with a magnitude corresponding to the converted state to the optical transceiver 21, as operation instruction information.

Specifically, for example, after encoding a plurality of binary control signals into a single ternary control signal, the ternary control signal is outputted to a control target, i.e., the optical transceiver. Then, the encoded control signal is decoded by the optical transceiver 21 into a plurality of binary control signals.

By such a configuration, for example, when the operating state of an optical transceiver operable in three states is controlled by two binary control signals, terminals for providing the control signals to the optical transceiver can be integrated into one. Namely, the optical transceiver can be controlled using a plurality of control signals, and a reduction in the number of terminals of the optical transceiver can be achieved.

Therefore, in the optical transceiver according to the first embodiment of the present invention, the operating state of the optical transceiver can be controlled and a reduction in the number of terminals of the optical transceiver can be achieved. In addition, since it does not take time to decode control signals, a reduction in the response rate of the optical transceiver 21 can be prevented.

In addition, in the optical network unit according to the first embodiment of the present invention, the optical transceiver 21 is operable in the transmission-off state, the standby state, and the transmission-on state for transmission of optical signals. The transmission-off state, the standby state, and the transmission-on state transition in sequence.

By such a configuration, a transition of three states of the transmitting unit in the optical transceiver 21 can be controlled, and thus, the upstream frame transmission intervals of each optical network unit 202 can be set to be shorter and the power saving operation of each optical network unit 202 can be minutely set. Therefore, power saving of the optical transceiver can be achieved using a plurality of control signals, and a reduction in the number of terminals of the optical transceiver can be achieved.

In addition, in the optical transceiver according to the first embodiment of the present invention, in the transmission-off state, the bias circuit 68 stops power supply to the light-emitting circuit 75, and the power sources 64 to 66 stop power supply to the transmission modulation circuit 74. In the transmission-on state, the bias circuit 68 supplies power to the light-emitting circuit 75, and the power sources 64 to 66 supply power to the transmission modulation circuit 74.

In the standby state, the bias circuit 68 stops power supply to the light-emitting circuit 75, and the power sources 64 to 66 supply power to the transmission modulation circuit 74.

By such a configuration, a reduction in the number of terminals of the optical transceiver can be achieved and power saving control of each circuit in the burst transmitting unit 31 in the optical transceiver 21 can be appropriately performed.

In addition, in the optical network unit according to the first embodiment of the present invention, the transmission-off state, the standby state, and the transmission-on state transition in sequence in this order and in both directions. The instructing unit 11 outputs, as operation instruction information indicating the standby state, an intermediate voltage between voltages outputted to the optical transceiver 21 as operation instruction information indicating the transmission-on state and the transmission-off state, to the optical transceiver 21. Alternatively, the instructing unit 11 outputs, as operation instruction information indicating the standby state, an intermediate current between currents outputted to the optical transceiver 21 as operation instruction information indicating the transmission-on state and the transmission-off state, to the optical transceiver 21.

In addition, in the optical transceiver according to the first embodiment of the present invention, the transmission-off state, the standby state, and the transmission-on state transition in sequence in this order and in both directions. The voltage received by the control terminal 12 as operation instruction information indicating the standby state is an intermediate voltage between voltages received by the control terminal 12 as operation instruction information indicating the transmission-on state and the transmission-off state. Alternatively, the current received by the control terminal 12 as operation instruction information indicating the standby state is an intermediate current between currents received by the control terminal 12 as operation instruction information indicating the transmission-on state and the transmission-off state.

By such a configuration, the amount of change in voltage or current received by the optical transceiver 21 as operation instruction information, which results from a state transition of the optical transceiver 21 can be reduced, enabling to improve the response rate of the optical transceiver 21.

Next, another embodiment of the present invention will be described using the drawings. Note that the same or corresponding portions in the drawings are denoted by the same reference signs and description thereof is not repeated.

Second Embodiment

The present embodiment relates to a PON system in which an optical network unit controls the state of its optical transceiver for both transmission and reception, compared to a PON system according to the first embodiment. Details other than those described below are the same as those of the PON system according to the first embodiment.

[Configuration and Basic Operation]

An optical transceiver 21 is operable in three or more states for the transmission or reception of optical signals, by a plurality of control signals from a control unit 29, and the states transition in sequence, i.e., in series. For example, a burst transmitting unit 31 and a burst receiving unit 32 in the optical transceiver 21 are operable in a transmission/reception-off state in which the transmission operation and reception operation of optical signals are stopped; a transmission-off state in which the transmission operation of optical signals is stopped and the reception operation of optical signals is performed; a transmission standby state in which transmission of optical signals is prepared and the reception operation of optical signals is performed; and a transmission/reception-on state in which the transmission operation and reception operation of optical signals are performed. The transmission/reception-off state, the transmission-off state, the transmission standby state, and the transmission/reception-on state transition in sequence, i.e., in series.

The control unit 29 generates control signals that control in which one of the above-described states the optical transceiver 21 is allowed to operate, e.g., a plurality of control signals that control whether to supply power to an optical signal transmitting or receiving unit in the optical transceiver 21.

Specifically, in the transmission/reception-off state, a bias circuit 68 stops power supply to a light-emitting circuit 75, power sources 64 to 66 stop power supply to a transmission modulation circuit 74, and power sources 88 to 90 stop power supply to a CDR 83, an equalizer circuit 84, and an output buffer 85 which are a light-receiving circuit.

In the transmission-off state, the bias circuit 68 stops power supply to the light-emitting circuit 75, the power sources 64 to 66 stop power supply to the transmission modulation circuit 74, and the power sources 88 to 90 supply power to the light-receiving circuit.

In the transmission standby state, the bias circuit 68 stops power supply to the light-emitting circuit 75, the power sources 64 to 66 supply power to the transmission modulation circuit 74, and the power sources 88 to 90 supply power to the light-receiving circuit.

In the transmission/reception-on state, the bias circuit 68 supplies power to the light-emitting circuit 75, the power sources 64 to 66 supply power to the transmission modulation circuit 74, and the power sources 88 to 90 supply power to the light-receiving circuit.

Figure 12:
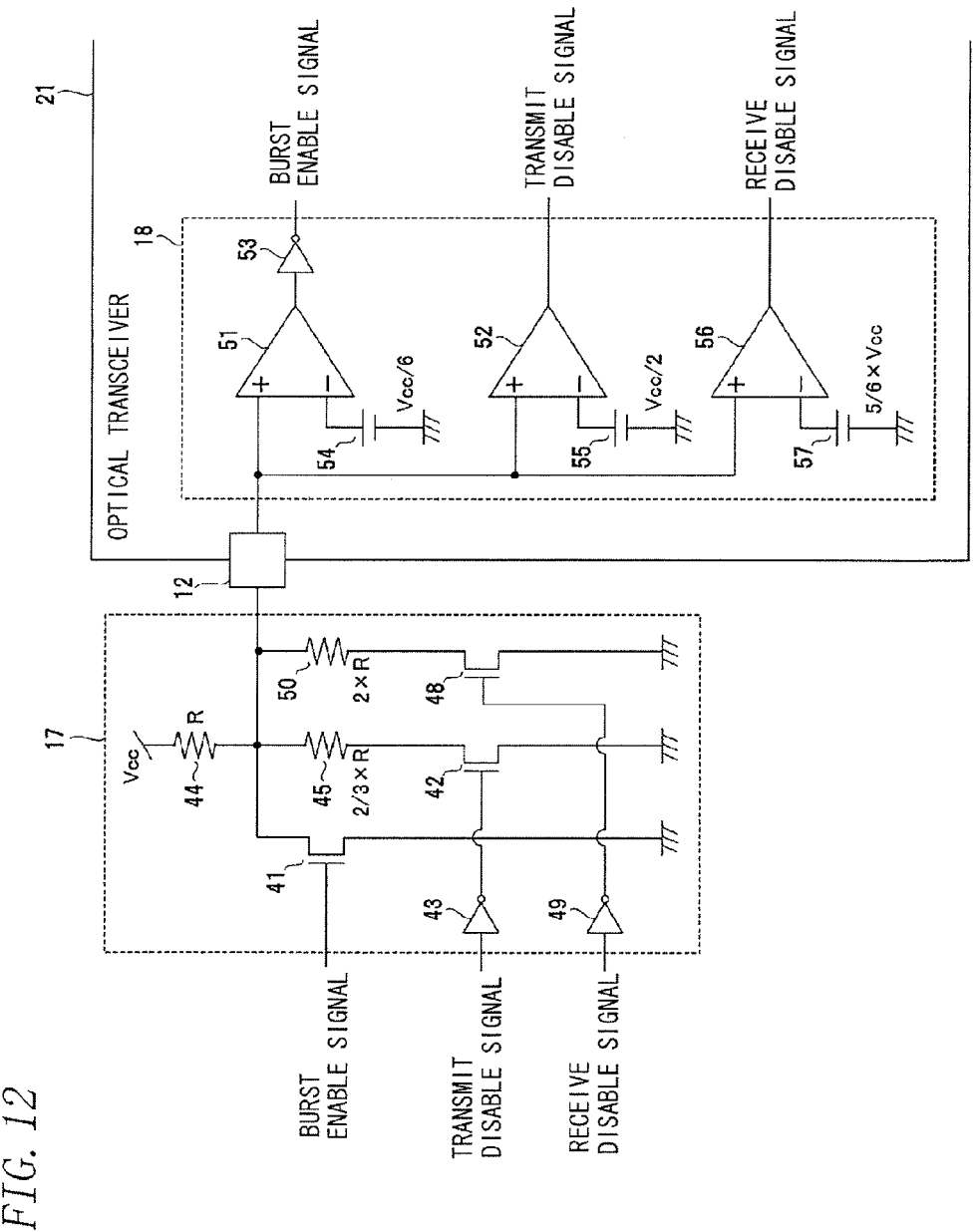
FIG. 12 is a diagram showing a configuration of transmission of control signals to the optical transceiver in the optical network unit according to the second embodiment of the present invention.

FIG. 12 is a diagram showing a configuration of transmission of control signals to an optical transceiver in an optical network unit according to a second embodiment of the present invention.

Referring to FIG. 12, an optical network unit 202 further includes an instructing unit 17. The instructing unit 17 includes N-channel MOS transistors 41, 42, and 48, inverters 43 and 49, and resistors 44, 45, and 50. The optical transceiver 21 further includes a control terminal 12 and a determining unit 18. The determining unit 18 includes operational amplifiers 51, 52, and 56, an inverter 53, and constant voltage sources 54, 55, and 57.

The instructing unit 17 converts the control contents of a plurality of control signals generated by the control unit 29 into one of the transmission/reception-off state, the transmission-off state, the transmission standby state, and the transmission/reception-on state, and outputs a voltage with a magnitude corresponding to the converted state to the control terminal 12 of the optical transceiver 21, as operation instruction information. Namely, the control terminal 12 receives the voltage as operation instruction information indicating in which one of the above-described states operation is to be performed.

The determining unit 18 determines one of the above-described states that is indicated by the operation instruction information, based on the magnitude of the voltage received by the control terminal 12.

The burst transmitting unit 31 and the burst receiving unit 32 in the optical transceiver 21 operate in the one of the above-described states determined by the determining unit 18.

More specifically, in the instructing unit 17, the resistor 44 has a first end connected to a node to which a power supply voltage Vcc is supplied; and a second end connected to the control terminal 12 of the optical transceiver 21. The resistor 45 has a first end connected to the second end of the resistor 44; and a second end. The N-channel MOS transistor 41 has a gate that receives a burst enable signal transmitted from the control unit 29; a drain connected to the control terminal 12 of the optical transceiver 21; and a source connected to a ground node to which a ground voltage is supplied. The N-channel MOS transistor 42 has a gate that receives, via the inverter 43, a transmit disable signal transmitted from the control unit 29; a drain connected to the second end of the resistor 45; and a source connected to a ground node to which a ground voltage is supplied. The resistor 50 has a first end connected to the second end of the resistor 44; and a second end. The N-channel MOS transistor 48 has a gate that receives, via the inverter 49, a receive disable signal transmitted from the control unit 29; a drain connected to the second end of the resistor 50; and a source connected to a ground node to which a ground voltage is supplied. The inverter 43 inverts the logic level of the transmit disable signal received from the control unit 29 and outputs the transmit disable signal. The inverter 49 inverts the logic level of the receive disable signal received from the control unit 29 and outputs the receive disable signal. Here, the resistance value of the resistor 44 is R, the resistance value of the resistor 45 is R×⅔, and the resistance value of the resistor 50 is 2×R.

In the determining unit 18, the operational amplifier 51 has a non-inverting input terminal connected to the control terminal 12; an inverting input terminal that receives a voltage of Vcc/6 from the constant voltage source 54; and an output terminal. The operational amplifier 52 has a non-inverting input terminal connected to the control terminal 12; an inverting input terminal that receives a voltage of Vcc/2 from the constant voltage source 55; and an output terminal. The operational amplifier 56 has a non-inverting input terminal connected to the control terminal 12; an inverting input terminal that receives a voltage of (Vcc×⅚) from the constant voltage source 57; and an output terminal.

The operational amplifier 51 outputs a logic high level signal when the voltage at the non-inverting input terminal is higher than the voltage at the inverting input terminal, and outputs a logic low level signal when the voltage at the non-inverting input terminal is lower than the voltage at the inverting input terminal.

The inverter 53 inverts the logic level of the signal received from the operational amplifier 51 and outputs the signal as a burst enable signal.

The operational amplifier 52 outputs a logic high level signal as a transmit disable signal when the voltage at the non-inverting input terminal is higher than the voltage at the inverting input terminal, and outputs a logic low level signal as a transmit disable signal when the voltage at the non-inverting input terminal is lower than the voltage at the inverting input terminal.

The operational amplifier 56 outputs a logic high level signal as a receive disable signal when the voltage at the non-inverting input terminal is higher than the voltage at the inverting input terminal, and outputs a logic low level signal as a receive disable signal when the voltage at the non-inverting input terminal is lower than the voltage at the inverting input terminal.

FIG. 13 is a diagram showing the relationship of the logic levels of the control signals to the optical transceiver, the voltage at the control terminal, and the operating state of the optical transceiver, for the optical network unit according to the second embodiment of the present invention.

Referring to FIG. 13, when the burst enable signal is at a logic low level, the transmit disable signal is at a logic high level, and the receive disable signal is at a logic high level, the N-channel MOS transistors 41, 42 and 48 are turned off. By this, the voltage at the control terminal 12 reaches Vcc.

At this time, in the determining unit 18, a burst enable signal of a logic low level is outputted from the inverter 53, a transmit disable signal of a logic high level is outputted from the operational amplifier 52, and a receive disable signal of a logic high level is outputted from the operational amplifier 56. By this, the optical transceiver 21 is placed in a transmission/reception-off state.

When the burst enable signal is at a logic low level, the transmit disable signal is at a logic high level, and the receive disable signal is at a logic low level, the N-channel MOS transistors 41 and 42 are turned off and the N-channel MOS transistor 48 is turned on. By this, the voltage at the control terminal 12 reaches Vcc×⅔.

At this time, in the determining unit 18, a burst enable signal of a logic low level is outputted from the inverter 53, a transmit disable signal of a logic high level is outputted from the operational amplifier 52, and a receive disable signal of a logic low level is outputted from the operational amplifier 56. By this, the optical transceiver 21 is placed in a transmission-off state.

When the burst enable signal is at a logic low level, the transmit disable signal is at a logic low level, and the receive disable signal is at a logic low level, the N-channel MOS transistor 41 is turned off and the N-channel MOS transistors 42 and 48 are turned on. By this, the voltage at the control terminal 12 reaches Vcc/3.

At this time, in the determining unit 18, a burst enable signal of a logic low level is outputted from the inverter 53, a transmit disable signal of a logic low level is outputted from the operational amplifier 52, and a receive disable signal of a logic low level is outputted from the operational amplifier 56. By this, the optical transceiver 21 is placed in a transmission standby state.

When the burst enable signal is at a logic high level, the transmit disable signal is at a logic low level, and the receive disable signal is at a logic low level, the N-channel MOS transistors 41, 42 and 48 are turned on. By this, the voltage at the control terminal 12 reaches zero.

At this time, in the determining unit 18, a burst enable signal of a logic high level is outputted from the inverter 53, a transmit disable signal of a logic low level is outputted from the operational amplifier 52, and a receive disable signal of a logic low level is outputted from the operational amplifier 56. By this, the optical transceiver 21 is placed in a transmission/reception-on state.

When the burst enable signal is at a logic low level, the transmit disable signal is at a logic low level, and the receive disable signal is at a logic high level, the voltage at the control terminal 12 reaches Vcc×⅔, as in the case in which the burst enable signal is at a logic low level, the transmit disable signal is at a logic high level, and the receive disable signal is at a logic low level. However, in a PON system 301, the control signals are not placed in such a state and thus it is unavailable operation.

Of the states in which the burst enable signal goes to a logic high level, in those states other than that described above, in the PON system 301, it is unavailable operation. Specifically, the optical network unit 202 cannot perform upstream frame transmission to an optical line terminal 201 unless the optical network unit 202 receives a downstream frame such as a gate frame from the optical line terminal 201. Hence, when the burst enable signal is at a logic high level, the downstream frame reception operation of the optical network unit 202 is not supposed to stop. Taking this into account, when the burst enable signal is at a logic high level, the voltage at the control terminal 12 is set to zero, regardless of the logic level of the receive disable signal.

Namely, in the optical network unit according to the second embodiment of the present invention, by treating the states such as those described above as unavailable operation, a reduction in the number of terminals is achieved.

As such, the instructing unit 17 outputs, as operation instruction information indicating the transmission-off state, Vcc×⅔ which is an intermediate voltage between a voltage Vcc outputted to the optical transceiver 21 as operation instruction information indicating the transmission/reception-off state and a voltage Vcc/3 outputted to the optical transceiver 21 as operation instruction information indicating the transmission standby state, to the optical transceiver 21. In addition, the instructing unit 17 outputs, as operation instruction information indicating the transmission standby state, Vcc/3 which is an intermediate voltage between a voltage Vcc×⅔ outputted to the optical transceiver 21 as operation instruction information indicating the transmission-off state and a ground voltage outputted to the optical transceiver 21 as operation instruction information indicating the transmission/reception-on state, to the optical transceiver 21.

Namely, the voltage received by the control terminal 12 as operation instruction information indicating the transmission-off state is an intermediate voltage between a voltage received by the control terminal 12 as operation instruction information indicating the transmission/reception-off state and a voltage received by the control terminal 12 as operation instruction information indicating the transmission standby state. In addition, the voltage received by the control terminal 12 as operation instruction information indicating the transmission standby state is an intermediate voltage between a voltage received by the control terminal 12 as operation instruction information indicating the transmission-off state and a voltage received by the control terminal 12 as operation instruction information indicating the transmission/reception-on state.

Figure 14:
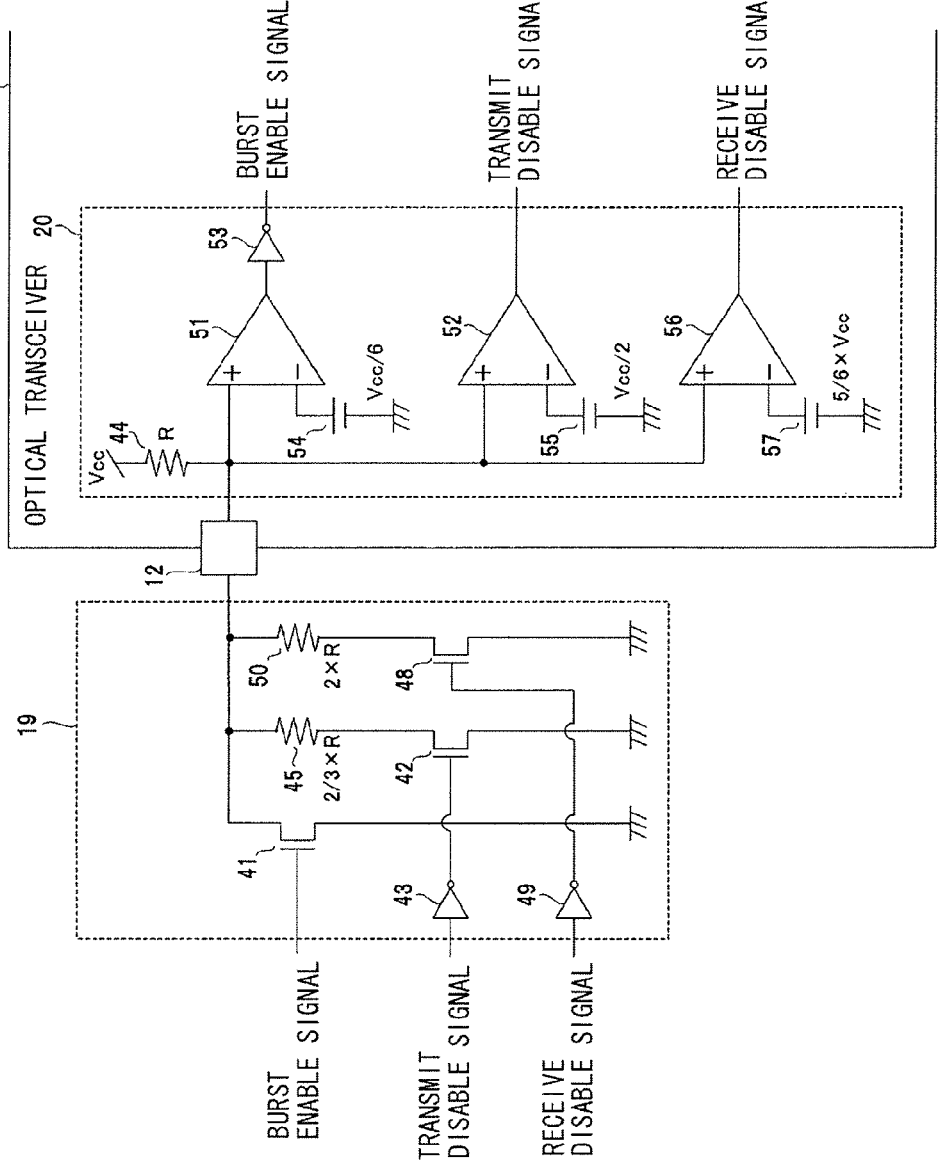
FIG. 14 is a diagram showing a variant of the configuration of transmission of control signals to the optical transceiver in the optical network unit according to the second embodiment of the present invention.

FIG. 14 is a diagram showing a variant of the configuration of transmission of control signals to the optical transceiver in the optical network unit according to the second embodiment of the present invention. Details other than those described below are the same as those of the configuration shown in FIG. 12.

Referring to FIG. 14, the optical network unit 202 includes an instructing unit 19 instead of the instructing unit 17. The instructing unit 19 includes N-channel MOS transistors 41, 42, and 48, inverters 43 and 49, and resistors 45 and 50. The optical transceiver 21 includes a determining unit 20 instead of the determining unit 18. The determining unit 20 includes a resistor 44, operational amplifiers 51, 52 and, 56, an inverter 53, and constant voltage sources 54, 55, and 57.

In the instructing unit 19, the resistor 45 has a first end connected to the control terminal 12 of the optical transceiver 21; and a second end connected to a drain of the N-channel MOS transistor 42. The resistor 50 has a first end connected to the control terminal 12 of the optical transceiver 21; and a second end connected to a drain of the N-channel MOS transistor 48.

In the determining unit 20, the resistor 44 has a first end connected to a node to which a power supply voltage Vcc is supplied; and a second end connected to the control terminal 12 of the optical transceiver 21.

In the variant, the instructing unit 19 converts the control contents of a plurality of control signals generated by the control unit 29 into one of the states of the optical transceiver 21, and outputs a current with a magnitude corresponding to the converted state to the control terminal 12 of the optical transceiver 21, as operation instruction information. Namely, the control terminal 12 receives the current as operation instruction information indicating in which one of the above-described states operation is to be performed.

The determining unit 20 determines one of the above-described states that is indicated by the operation instruction information, based on the magnitude of the current received by the control terminal 12.

The burst transmitting unit 31 and the burst receiving unit 32 in the optical transceiver 21 operate in the one of the above-described states determined by the determining unit 20.

Note that the relationship of the logic levels of the control signals to the optical transceiver, the voltage at the control terminal, and the operating state of the optical transceiver in the variant is the same as that in FIG. 13.

Specifically, the instructing unit 19 outputs, as operation instruction information indicating the transmission-off state, an intermediate current between a current outputted to the optical transceiver 21 as operation instruction information indicating the transmission/reception-off state and a current outputted to the optical transceiver 21 as operation instruction information indicating the transmission standby state, to the optical transceiver 21. In addition, the instructing unit 19 outputs, as operation instruction information indicating the transmission standby state, an intermediate current between a current outputted to the optical transceiver 21 as operation instruction information indicating the transmission-off state and a current outputted to the optical transceiver 21 as operation instruction information indicating the transmission/reception-on state, to the optical transceiver 21.

In other words, the current received by the control terminal 12 as operation instruction information indicating the transmission-off state is an intermediate current between a current received by the control terminal 12 as operation instruction information indicating the transmission/reception-off state and a current received by the control terminal 12 as operation instruction information indicating the transmission standby state. In addition, the current received by the control terminal 12 as operation instruction information indicating the transmission standby state is an intermediate current between a current received by the control terminal 12 as operation instruction information indicating the transmission-off state and a current received by the control terminal 12 as operation instruction information indicating the transmission/reception-on state.

Figure 15:
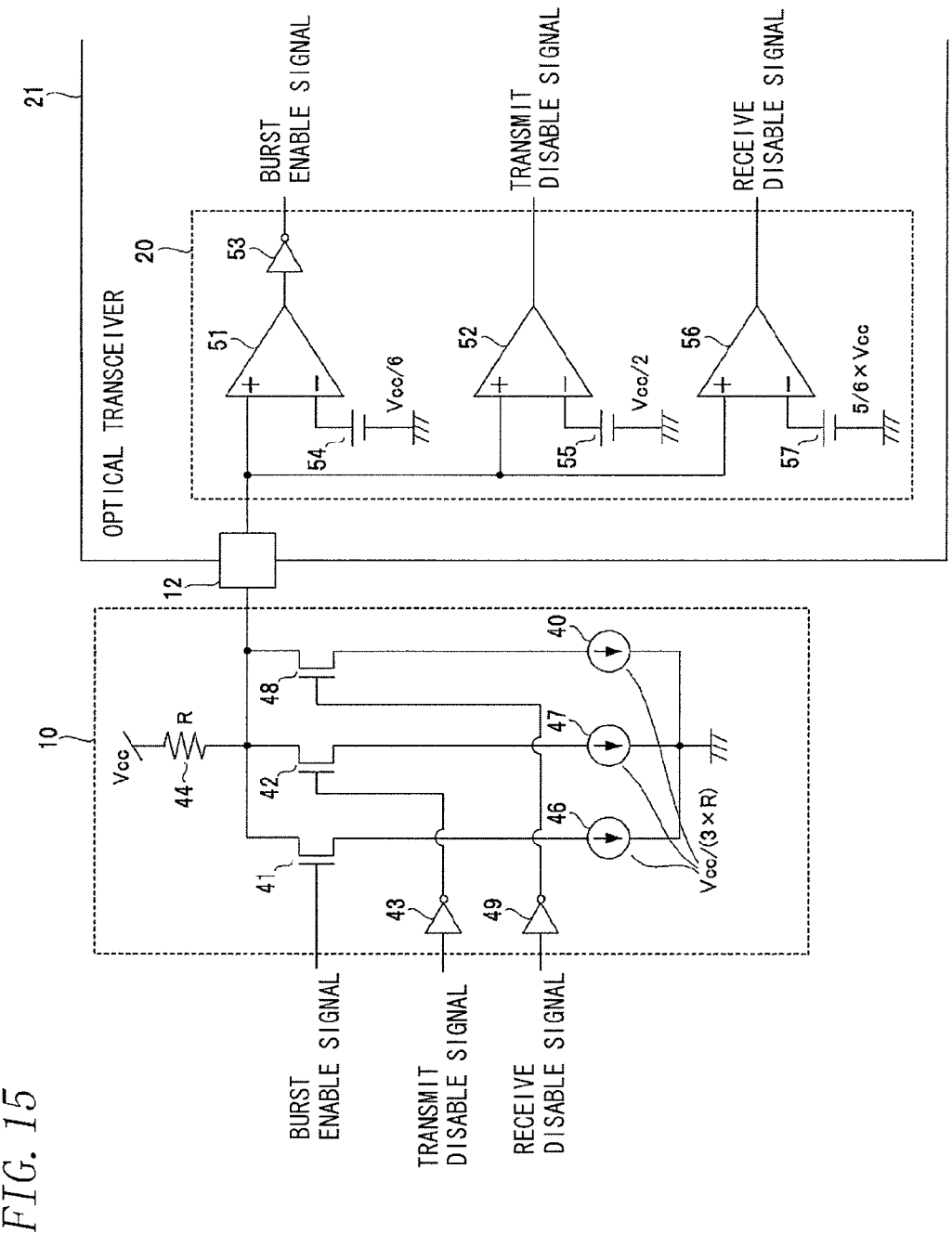
FIG. 15 is a diagram showing a variant of the configuration of transmission of control signals to the optical transceiver in the optical network unit according to the second embodiment of the present invention.

FIG. 15 is a diagram showing a variant of the configuration of transmission of control signals to the optical transceiver in the optical network unit according to the second embodiment of the present invention. Details other than those described below are the same as those of the configuration shown in FIG. 12.

Referring to FIG. 15, the optical network unit 202 includes an instructing unit 10 instead of the instructing unit 19. The instructing unit 10 includes N-channel MOS transistors 41, 42, and 48, inverters 43 and 49, a resistor 44, and constant current sources 40, 46, and 47.

In the instructing unit 10, the resistor 44 has a first end connected to a node to which a power supply voltage Vcc is supplied; and a second end connected to the control terminal 12 of the optical transceiver 21. The N-channel MOS transistor 41 has a gate that receives a burst enable signal transmitted from the control unit 29; a drain connected to the control terminal 12 of the optical transceiver 21; and a source connected to a first end of the constant current source 46. The N-channel MOS transistor 42 has a gate that receives, via the inverter 43, a transmit disable signal transmitted from the control unit 29; a drain connected to the control terminal 12 of the optical transceiver 21; and a source connected to a first end of the constant current source 47. The N-channel MOS transistor 48 has a gate that receives, via the inverter 49, a receive disable signal transmitted from the control unit 29; a drain connected to the control terminal 12 of the optical transceiver 21; and a source connected to a first end of the constant current source 40. Second ends of the constant current sources 46, 47, and 40 are connected to a ground node to which a ground voltage is supplied. The inverter 43 inverts the logic level of the transmit disable signal received from the control unit 29 and outputs the transmit disable signal. The inverter 49 inverts the logic level of the receive disable signal received from the control unit 29 and outputs the receive disable signal. Here, the resistance value of the resistor 44 is R and the constant current sources 46, 47, and 40 each output a current of Vcc/(3×R).

FIG. 16 is a diagram showing the relationship of the logic levels of the control signals to the optical transceiver, the voltage at the control terminal, and the operating state of the optical transceiver, for the optical network unit according to the second embodiment (FIG. 15) of the present invention.

Referring to FIG. 16, when the burst enable signal is at a logic low level, the transmit disable signal is at a logic high level, and the receive disable signal is at a logic high level, the N-channel MOS transistors 41, 42 and 48 are turned off By this, the voltage at the control terminal 12 reaches Vcc.

At this time, in the determining unit 20, a burst enable signal of a logic low level is outputted from the inverter 53, a transmit disable signal of a logic high level is outputted from the operational amplifier 52, and a receive disable signal of a logic high level is outputted from the operational amplifier 56. By this, the optical transceiver 21 is placed in a transmission/reception-off state.

When the burst enable signal is at a logic low level, the transmit disable signal is at a logic high level, and the receive disable signal is at a logic low level, the N-channel MOS transistors 41 and 42 are turned off and the N-channel MOS transistor 48 is turned on, whereby the constant current source 40 outputs a current. By this, the voltage at the control terminal 12 reaches Vcc×⅔.

At this time, in the determining unit 20, a burst enable signal of a logic low level is outputted from the inverter 53, a transmit disable signal of a logic high level is outputted from the operational amplifier 52, and a receive disable signal of a logic low level is outputted from the operational amplifier 56. By this, the optical transceiver 21 is placed in a transmission-off state.

When the burst enable signal is at a logic low level, the transmit disable signal is at a logic low level, and the receive disable signal is at a logic low level, the N-channel MOS transistor 41 is turned off and the N-channel MOS transistors 42 and 48 are turned on, whereby the constant current sources 47 and 40 output currents. By this, the voltage at the control terminal 12 reaches Vcc/3.

At this time, in the determining unit 20, a burst enable signal of a logic low level is outputted from the inverter 53, a transmit disable signal of a logic low level is outputted from the operational amplifier 52, and a receive disable signal of a logic low level is outputted from the operational amplifier 56. By this, the optical transceiver 21 is placed in a transmission standby state.

When the burst enable signal is at a logic high level, the transmit disable signal is at a logic low level, and the receive disable signal is at a logic low level, the N-channel MOS transistors 41, 42 and 48 are turned on, whereby the constant current sources 46, 47, and 40 output currents. By this, the voltage at the control terminal 12 reaches zero.

At this time, in the determining unit 20, a burst enable signal of a logic high level is outputted from the inverter 53, a transmit disable signal of a logic low level is outputted from the operational amplifier 52, and a receive disable signal of a logic low level is outputted from the operational amplifier 56. By this, the optical transceiver 21 is placed in a transmission/reception-on state.

Note that in all those states other than those described above, in the PON system 301, it is unavailable operation. Note also that in the configuration shown in FIG. 15, too, as with the configuration shown in FIG. 14, the resistor 44 can be provided on the side of the optical transceiver 21.

Figure 17:
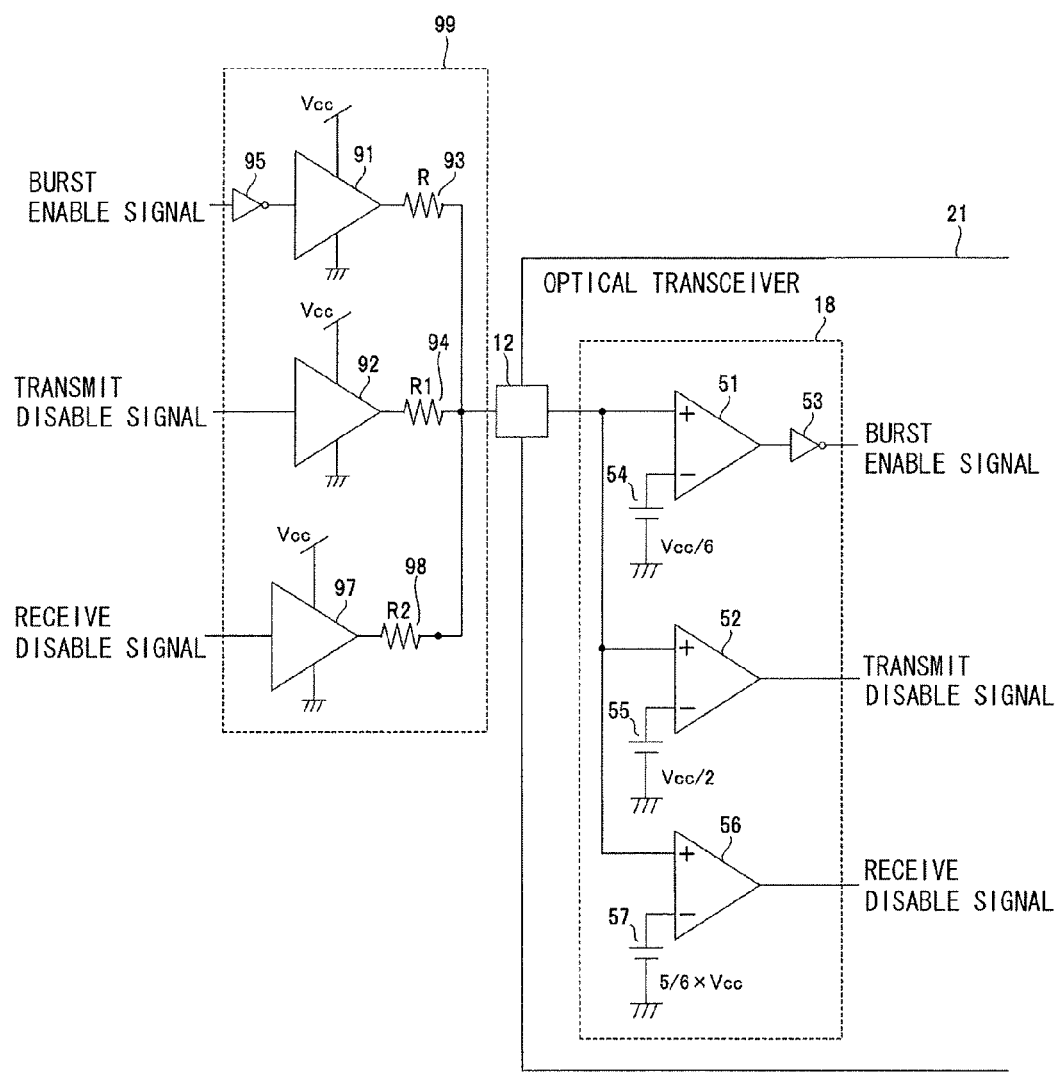
FIG. 17 is a diagram showing a variant of the configuration of transmission of control signals to the optical transceiver in the optical network unit according to the second embodiment of the present invention.

FIG. 17 is a diagram showing a variant of the configuration of transmission of control signals to the optical transceiver in the optical network unit according to the second embodiment of the present invention. Details other than those described below are the same as those of the configuration shown in FIG. 12.

Referring to FIG. 17, the optical network unit 202 includes an instructing unit 99 instead of the instructing unit 19. The instructing unit 99 includes buffers 91, 92, and 97, resistors 93, 94, and 98, and an inverter 95.

The resistor 93 has a first end connected to an output terminal of the buffer 91; and a second end connected to the control terminal 12. The resistor 94 has a first end connected to an output terminal of the buffer 92; and a second end connected to the control terminal 12. The resistor 98 has a first end connected to an output terminal of the buffer 97; and a second end connected to the control terminal 12.

The buffers 91, 92, and 97 are, for example, CMOS (Complementary Metal Oxide Semiconductor) push-pull buffers. Here, the resistance value of the resistor 93 is R. When the resistance value of the resistor 94 is R1 and the resistance value of the resistor 98 is R2, the following relationships are established for R1 and R2:

$R1//R2=R/2$ $R//R1=R2/2$

Therefore, $R1=R2=R$.

The inverter 95 inverts the logic level of a burst enable signal received from the control unit 29 and outputs the burst enable signal to the buffer 91. The buffer 92 receives a transmit disable signal from the control unit 29. The buffer 97 receives a receive disable signal from the control unit 29.

FIG. 18 is a diagram showing the relationship of the logic levels of the control signals to the optical transceiver, the voltage at the control terminal, and the operating state of the optical transceiver, for the optical network unit according to the second embodiment (FIG. 17) of the present invention.

Referring to FIG. 18, when the burst enable signal is at a logic low level, the transmit disable signal is at a logic high level, and the receive disable signal is at a logic high level, the output from the buffer 91 goes to a logic high level, the output from the buffer 92 goes to a logic high level, and the output from the buffer 97 goes to a logic high level. By this, the voltage at the control terminal 12 reaches Vcc.

At this time, in the determining unit 18, a burst enable signal of a logic low level is outputted from the inverter 53, a transmit disable signal of a logic high level is outputted from the operational amplifier 52, and a receive disable signal of a logic high level is outputted from the operational amplifier 56. By this, the optical transceiver 21 is placed in a transmission/reception-off state.

When the burst enable signal is at a logic low level, the transmit disable signal is at a logic high level, and the receive disable signal is at a logic low level, the output from the buffer 91 goes to a logic high level, the output from the buffer 92 goes to a logic high level, and the output from the buffer 97 goes to a logic low level. By this, the voltage at the control terminal 12 reaches Vcc×⅔.

At this time, in the determining unit 18, a burst enable signal of a logic low level is outputted from the inverter 53, a transmit disable signal of a logic high level is outputted from the operational amplifier 52, and a receive disable signal of a logic low level is outputted from the operational amplifier 56. By this, the optical transceiver 21 is placed in a transmission-off state.

When the burst enable signal is at a logic low level, the transmit disable signal is at a logic low level, and the receive disable signal is at a logic low level, the output from the buffer 91 goes to a logic high level, the output from the buffer 92 goes to a logic low level, and the output from the buffer 97 goes to a logic low level. By this, the voltage at the control terminal 12 reaches Vcc/3.

At this time, in the determining unit 18, a burst enable signal of a logic low level is outputted from the inverter 53, a transmit disable signal of a logic low level is outputted from the operational amplifier 52, and a receive disable signal of a logic low level is outputted from the operational amplifier 56. By this, the optical transceiver 21 is placed in a transmission standby state.

When the burst enable signal is at a logic high level, the transmit disable signal is at a logic low level, and the receive disable signal is at a logic low level, the output from the buffer 91 goes to a logic low level, the output from the buffer 92 goes to a logic low level, and the output from the buffer 97 goes to a logic low level. By this, the voltage at the control terminal 12 reaches zero.

At this time, in the determining unit 18, a burst enable signal of a logic high level is outputted from the inverter 53, a transmit disable signal of a logic low level is outputted from the operational amplifier 52, and a receive disable signal of a logic low level is outputted from the operational amplifier 56. By this, the optical transceiver 21 is placed in a transmission/reception-on state.

Note that in all those states other than those described above, in the PON system 301, it is unavailable operation.

As such, by the configuration using CMOS push-pull buffers, for example, the responsivity upon turn-off can be increased, compared to the configuration using N-channel MOS transistors such as that shown in FIG. 12, etc.

[Operation]

Next, the power saving operation of the optical network unit according to the second embodiment of the present invention will be described using the drawings.

Figure 19:
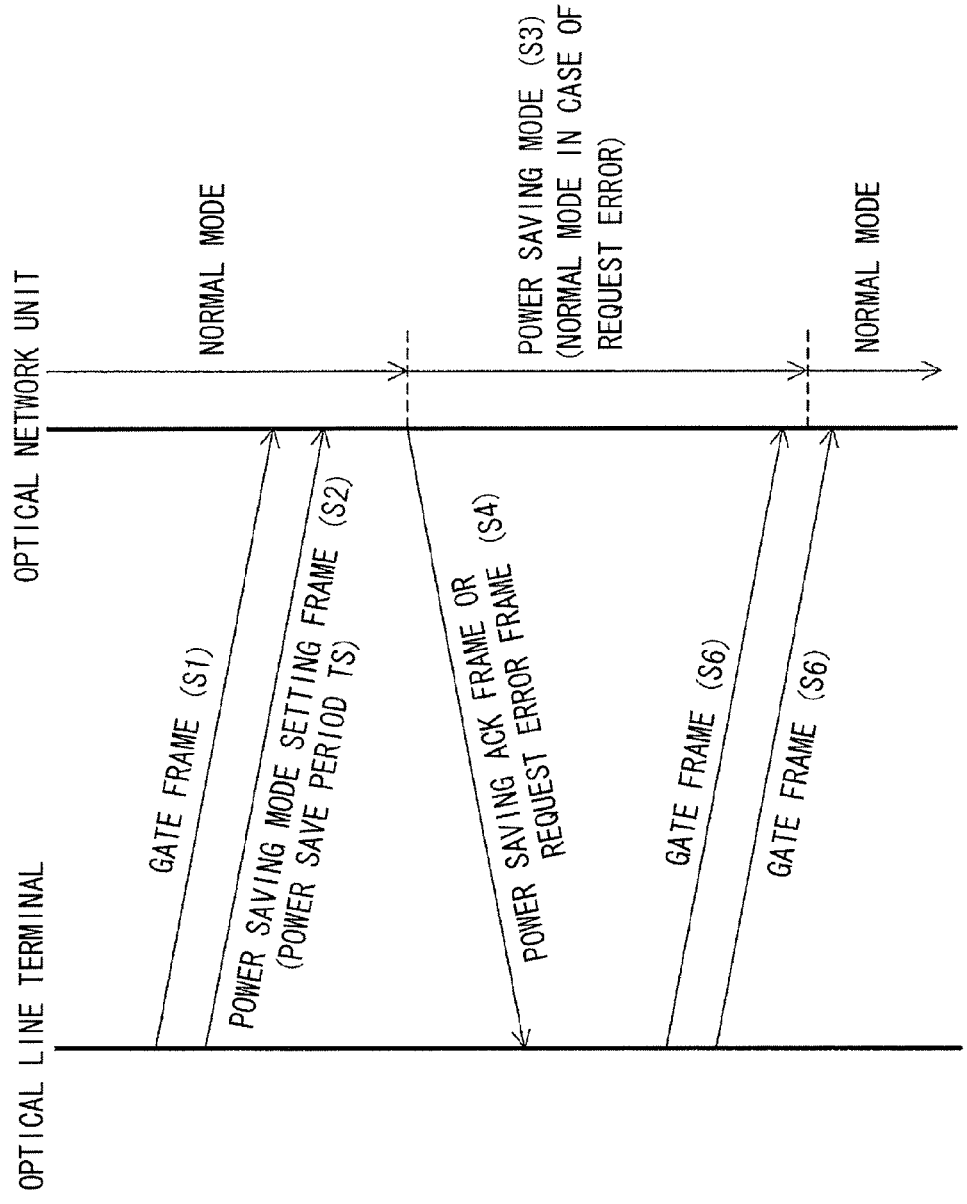
FIG. 19 is a diagram showing the flow of data between an optical line terminal and an optical network unit in a PON system according to the second embodiment of the present invention, and the operating modes of the optical network unit.

FIG. 19 is a diagram showing the flow of data between an optical line terminal and an optical network unit in the PON system according to the second embodiment of the present invention, and the operating modes of the optical network unit. Although in FIG. 19 a process performed between the optical line terminal and one optical network unit is described, the same applies to the case in which a plurality of optical network units are connected to the optical line terminal.

Referring to FIG. 19, first, in a state in which an optical network unit 202 operates in a normal mode, an optical line terminal 201 transmits a gate frame to the optical network unit 202 (step S1) and transmits a power saving mode setting frame to the optical network unit 202. The power saving mode setting frame includes, for example, a power save period TS and start timing ta thereof (step S2).

Then, at the start timing ta of the power save period TS, the optical network unit 202 transitions to a power saving mode (step S3).

In addition, the optical network unit 202 transmits a power saving ACK frame in response to the power saving mode setting frame, to the optical line terminal 201 (step S4).

Note that when the optical network unit 202 determines, from the relationship between the length of the power save period TS and the response times of the respective electric circuits in the optical transceiver 21, that the optical network unit 202 cannot transition to a power saving mode, the optical network unit 202 continuously operates in the normal mode (step S3) and transmits a request error frame to the optical line terminal 201 (step S4).

Then, at the end timing tb of the power save period TS, the optical network unit 202 transitions from the power saving mode to a normal mode (step S5).

In addition, regardless of whether the optical network unit 202 is operating in the normal mode or the power saving mode, the optical line terminal 201 transmits a gate frame to the optical network unit 202 (step S6).

Next, a power saving process performed by the optical network unit 202 will be described in detail.

The control unit 29 receives notification of a power saving period (power save period) during which the optical network unit 202 is to perform power saving operation, from the optical line terminal 201.

The control unit 29 plans the start and stop sequences of power supply from each power source, based on the response time of each electric circuit in the optical transceiver 21 with respect to the start and stop of power supply from a corresponding power source, and on the power saving period notified from the optical line terminal 201.

For example, the control unit 29 compares the response times of the respective electric circuits with the power saving period to determine, based on the comparison results, whether to stop power supply to the electric circuits for the power saving period.

In addition, upon the end of the power save period TS, the control unit 29 plans a sequence such that with reference to timing at which the optical network unit 202 should resume transmission of an optical signal, the electric circuits can operate before that timing.

Namely, the timing at which power supply to the electric circuits in the optical transceiver 21 is stopped is set to such timing that the electric circuits can resume their operation before the end timing of the power save period TS. Hence, when the power save period TS is short, power supply to an electric circuit with a long response time is not stopped.

Then, the power sources in the optical transceiver 21 supply power to their corresponding electric circuits, based on the sequences planned by the control unit 29.

Figure 20:
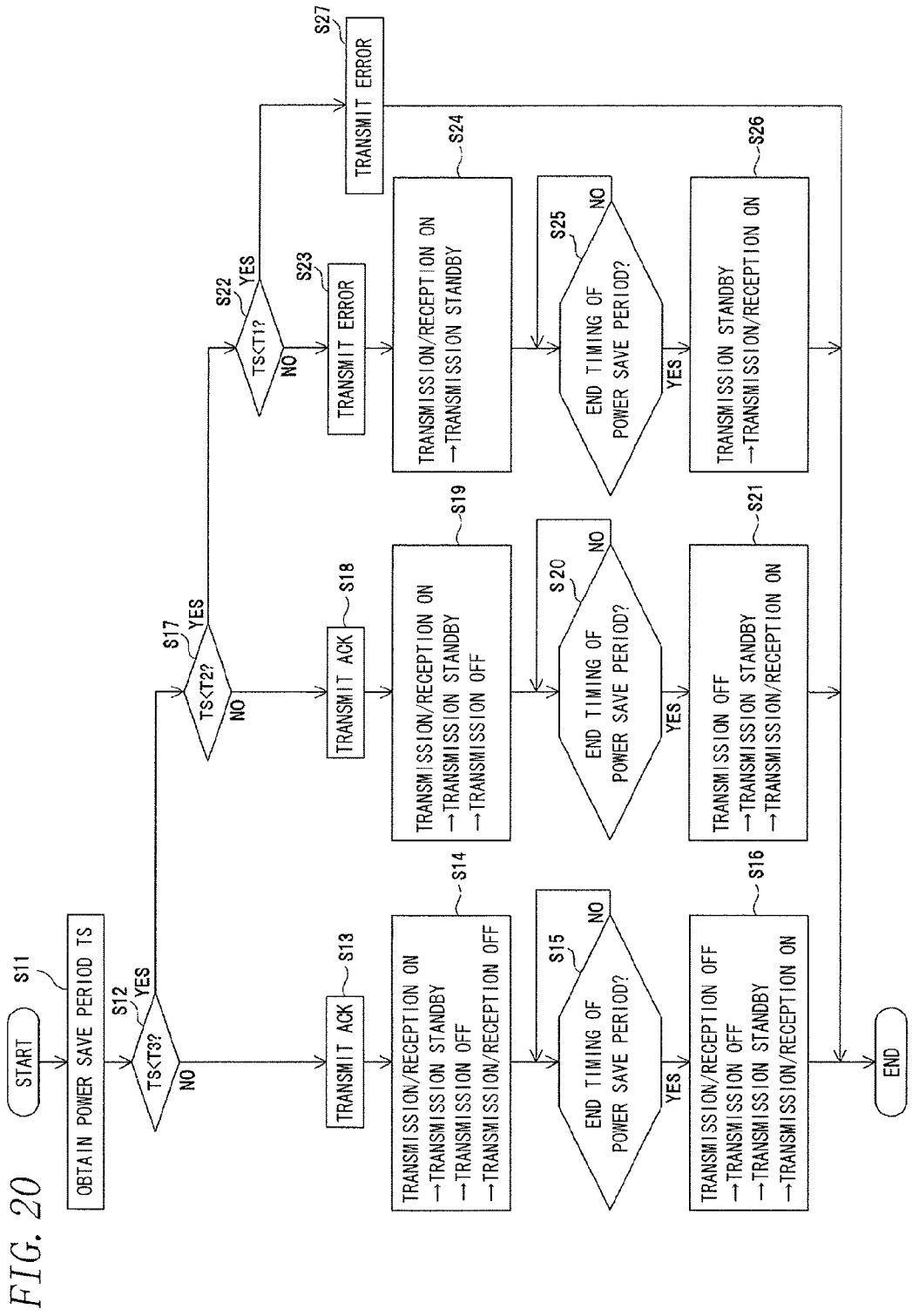
FIG. 20 is a flowchart defining an operation procedure for when an optical network unit in the PON system according to the second embodiment of the present invention performs a power saving process.

FIG. 20 is a flowchart defining an operation procedure for when an optical network unit in the PON system according to the second embodiment of the present invention performs a power saving process.

In FIG. 20, time T1 is the response time of the light-emitting circuit 75. Time T2 is the response time of the transmission modulation circuit 74. Time T2 is the highest one of the response times of the prebuffer circuit 61, the equalizer circuit 62, and the output buffer circuit 63. Time T3 is the highest one of the response times of the CDR 83, the equalizer circuit 84, and the output buffer 85.

Here, it is assumed, for example, that time T1<time T2<time T3. Time T1 to T3 are, as described above, saved in the memory unit 73 in the optical transceiver 21. The control unit 29 can read time T1 to T3 from the memory unit 73 via the I2C bus.

Referring to FIG. 20, first, in a normal mode, the control unit 29 receives a gate frame and a power saving mode setting frame which are transmitted from the optical line terminal 201. Then, the control unit 29 obtains a power save period TS included in the power saving mode setting frame (step S11).

Then, if the power save period TS is greater than or equal to time T3 (NO at step S12), then the control unit 29 determines that the optical network unit 202 is operable in a power saving mode, and thus, transmits a power saving ACK frame to the optical line terminal 201 (step S13).

Then, the control unit 29 sets the logic levels of the control signals in the manner described above, thereby allowing the optical transceiver 21 to transition from a transmission/reception-on state to a transmission standby state and transition to a transmission-off state and then transition to a transmission/reception-off state (step S14).

Then, if the end timing of the power save period TS has come (YES at step S15), then the control unit 29 returns to a normal mode from the power saving mode.

Specifically, by the control unit 29 setting the logic levels of the control signals in the manner described above, the optical transceiver 21 is allowed to transition from the transmission/reception-off state to a transmission-off state and transition to a transmission standby state and then transition to a transmission/reception-on state (step S16).

If the power save period TS is less than time T3 (YES at step S12) and is greater than or equal to time T2 (NO at step S17) then the control unit 29 determines that the optical network unit 202 is operable in a power saving mode without a transition of the optical transceiver 21 to a transmission/reception-off state, and thus, transmits a power saving ACK frame to the optical line terminal 201 (step S18).

Then, by the control unit 29 setting the logic levels of the control signals in the manner described above, the optical transceiver 21 is allowed to transition from a transmission/reception-on state to a transmission standby state and then transition to a transmission-off state (step S19).

Then, if the end timing of the power save period TS has come (YES at step S20), then the control unit 29 returns to a normal mode from the power saving mode.

Specifically, by the control unit 29 setting the logic levels of the control signals in the manner described above, the optical transceiver 21 is allowed to transition from the transmission-off state to a transmission standby state and then transition to a transmission/reception-on state (step S21).

If the power save period TS is less than time T2 (YES at step S17) and is greater than or equal to time T1 (NO at step S22), then the control unit 29 determines that the optical network unit 202 is not operable in a power saving mode, and thus, transmits a request error frame to the optical line terminal 201 (step S23).

Then, by the control unit 29 setting the logic levels of the control signals in the manner described above, the optical transceiver 21 is allowed to transition from a transmission/reception-on state to a transmission standby state (step S24).

Then, if the end timing of the power save period TS has come (YES at step S25), then the control unit 29 sets the logic levels of the control signals in the manner described above, thereby allowing the optical transceiver 21 to transition from the transmission standby state to a transmission/reception-on state (step S26). Specifically, the control unit 29 does not operate in a power saving mode and performs normal burst transmission control where in the optical transceiver 21 only power supply to the light-emitting circuit 75 is stopped.

If the power save period TS is less than time T1 (YES at step S22), then the control unit 29 transmits a request error frame to the optical line terminal 201. Namely, the control unit 29 does not transition to a power saving mode. In addition, the control unit 29 cannot even perform normal burst transmission control and thus does not perform control to stop power supply to the light-emitting circuit 75 in the optical transceiver 21 (step S27).

Note that in the above-described FIG. 11 the power save period TS is the period from timing t1 to timing t6, and the length of the period from timing t4 to timing t5 is set according to the length of the power save period TS. FIG. 11 shows the case in which the power save period TS is greater than or equal to (time T1+time T2).

As such, in the optical transceiver 21, the transmission/reception-off state, the transmission-off state, the transmission standby state, and the transmission/reception-on state transition in sequence in this order and in both directions.

Namely, in the examples shown in FIGS. 12, 14, and 15, the magnitude of a voltage or current received by the control terminal 12 when operation instruction information indicates each of the transmission/reception-off state, the transmission-off state, the transmission standby state, and the transmission/reception-on state changes in this order in a stepwise manner.

Other configurations and operation are the same as those in a PON system according to the first embodiment, and thus, detailed description thereof is not repeated here.

As described above, in the optical transceiver according to the second embodiment of the present invention, the burst transmitting unit 31 and the burst receiving unit 32 are operable in three or more states for transmission or reception of optical signals, and the states transition in sequence. The control terminal 12 receives a voltage or current as operation instruction information indicating in which one of the states operation is to be performed. The determining unit 18 determines one of the states that is indicated by the operation instruction information, based on the magnitude of the voltage or current received by the control terminal 12. Then, the burst transmitting unit 31 and the burst receiving unit 32 operate in the one of the states determined by the determining unit 13.

In addition, in the optical network unit according to the second embodiment of the present invention, the control unit 29 generates a plurality of control signals that control in which one of the above-described states the optical transceiver 21 is allowed to operate. The instructing unit 17 converts the control contents of the plurality of control signals generated by the control unit 29 into one of the above-described states, and outputs a voltage or current with a magnitude corresponding to the converted state to the optical transceiver 21, as operation instruction information.

Specifically, for example, after encoding a plurality of binary control signals into a single quaternary control signal, the quaternary control signal is outputted to a control target, i.e., the optical transceiver. Then, the encoded control signal is decoded by the optical transceiver 21 into a plurality of binary control signals.

By such a configuration, for example, when the operating state of an optical transceiver operable in four states is controlled by three binary control signals, terminals for providing the control signals to the optical transceiver can be integrated into one. Namely, the optical transceiver can be controlled using a plurality of control signals, and a reduction in the number of terminals of the optical transceiver can be achieved.

Therefore, in the optical transceiver according to the second embodiment of the present invention, the operating state of the optical transceiver can be controlled and a reduction in the number of terminals of the optical transceiver can be achieved. In addition, since it does not take time to decode control signals, a reduction in the response rate of the optical transceiver 21 can be prevented.

In addition, in the optical network unit according to the second embodiment of the present invention, the burst transmitting unit 31 and the burst receiving unit 32 in the optical transceiver 21 are operable in a transmission/reception-off state in which the transmission operation and reception operation of optical signals are stopped; a transmission-off state in which the transmission operation of optical signals is stopped and the reception operation of optical signals is performed; a transmission standby state in which transmission of optical signals is prepared and the reception operation of optical signals is performed; and a transmission/reception-on state in which the transmission operation and reception operation of optical signals are performed. The transmission/reception-off state, the transmission-off state, the transmission standby state, and the transmission/reception-on state transition in sequence.

By such a configuration, a transition of four states of the transmitting unit and the receiving unit in the optical transceiver 21 can be controlled, and thus, the upstream frame transmission intervals of each optical network unit 202 can be set to be shorter and the power saving operation of each optical network unit 202 can be minutely set. Therefore, power saving of the optical transceiver can be achieved using a plurality of control signals, and a reduction in the number of terminals of the optical transceiver can be achieved.

In addition, in the optical transceiver according to the second embodiment of the present invention, in the transmission/reception-off state, the bias circuit 68 stops power supply to the light-emitting circuit 75, the power sources 64 to 66 stop power supply to the transmission modulation circuit 74, and the power sources 88 to 90 stop power supply to the light-receiving circuit. In the transmission-off state, the bias circuit 68 stops power supply to the light-emitting circuit 75, the power sources 64 to 66 stop power supply to the transmission modulation circuit 74, and the power sources 88 to 90 supply power to the light-receiving circuit. In the transmission standby state, the bias circuit 68 stops power supply to the light-emitting circuit 75, the power sources 64 to 66 supply power to the transmission modulation circuit 74, and the power sources 88 to 90 supply power to the light-receiving circuit. In the transmission/reception-on state, the bias circuit 68 supplies power to the light-emitting circuit 75, the power sources 64 to 66 supply power to the transmission modulation circuit 74, and the power sources 88 to 90 supply power to the light-receiving circuit.

By such a configuration, a reduction in the number of terminals of the optical transceiver can be achieved and power saving control of each circuit in the burst transmitting unit 31 and the burst receiving unit 32 in the optical transceiver 21 can be appropriately performed.

In addition, in the optical network unit according to the second embodiment of the present invention, the transmission/reception-off state, the transmission-off state, the transmission standby state, and the transmission/reception-on state transition in sequence in this order and in both directions. The instructing unit 17 outputs, as operation instruction information indicating the transmission-off state, an intermediate voltage between voltages outputted to the optical transceiver 21 as operation instruction information indicating the transmission/reception-off state and the transmission standby state, to the optical transceiver 21. The instructing unit 17 outputs, as operation instruction information indicating the transmission standby state, an intermediate voltage between voltages outputted to the optical transceiver 21 as operation instruction information indicating the transmission-off state and the transmission/reception-on state, to the optical transceiver 21. Alternatively, the instructing unit 17 outputs, as operation instruction information indicating the transmission-off state, an intermediate current between currents outputted to the optical transceiver 21 as operation instruction information indicating the transmission/reception-off state and the transmission standby state, to the optical transceiver 21. The instructing unit 17 outputs, as operation instruction information indicating the transmission standby state, an intermediate current between currents outputted to the optical transceiver 21 as operation instruction information indicating the transmission-off state and the transmission/reception-on state, to the optical transceiver 21.

In addition, in the optical transceiver according to the second embodiment of the present invention, the transmission/reception-off state, the transmission-off state, the transmission standby state, and the transmission/reception-on state transition in sequence in this order and in both directions. The voltage received by the control terminal 12 as operation instruction information indicating the transmission-off state is an intermediate voltage between voltages received by the control terminal 12 as operation instruction information indicating the transmission/reception-off state and the transmission standby state. The voltage received by the control terminal 12 as operation instruction information indicating the transmission standby state is an intermediate voltage between voltages received by the control terminal 12 as operation instruction information indicating the transmission-off state and the transmission/reception-on state. Alternatively, the current received by the control terminal 12 as operation instruction information indicating the transmission-off state is an intermediate current between currents received by the control terminal 12 as operation instruction information indicating the transmission/reception-off state and the transmission standby state. The current received by the control terminal 12 as operation instruction information indicating the transmission standby state is an intermediate current between currents received by the control terminal 12 as operation instruction information indicating the transmission-off state and the transmission/reception-on state.

By such a configuration, the amount of change in voltage or current received by the optical transceiver 21 as operation instruction information, which results from a state transition of the optical transceiver 21 can be reduced, enabling to improve the response rate of the optical transceiver 21.

Next, another embodiment of the present invention will be described using the drawings. Note that the same or corresponding portions in the drawings are denoted by the same reference signs and description thereof is not repeated.

Third Embodiment

The present embodiment relates to a PON system in which control signals to be converted are changed, compared to a PON system according to the second embodiment. Details other than those described below are the same as those of the PON system according to the second embodiment.

Figure 21:
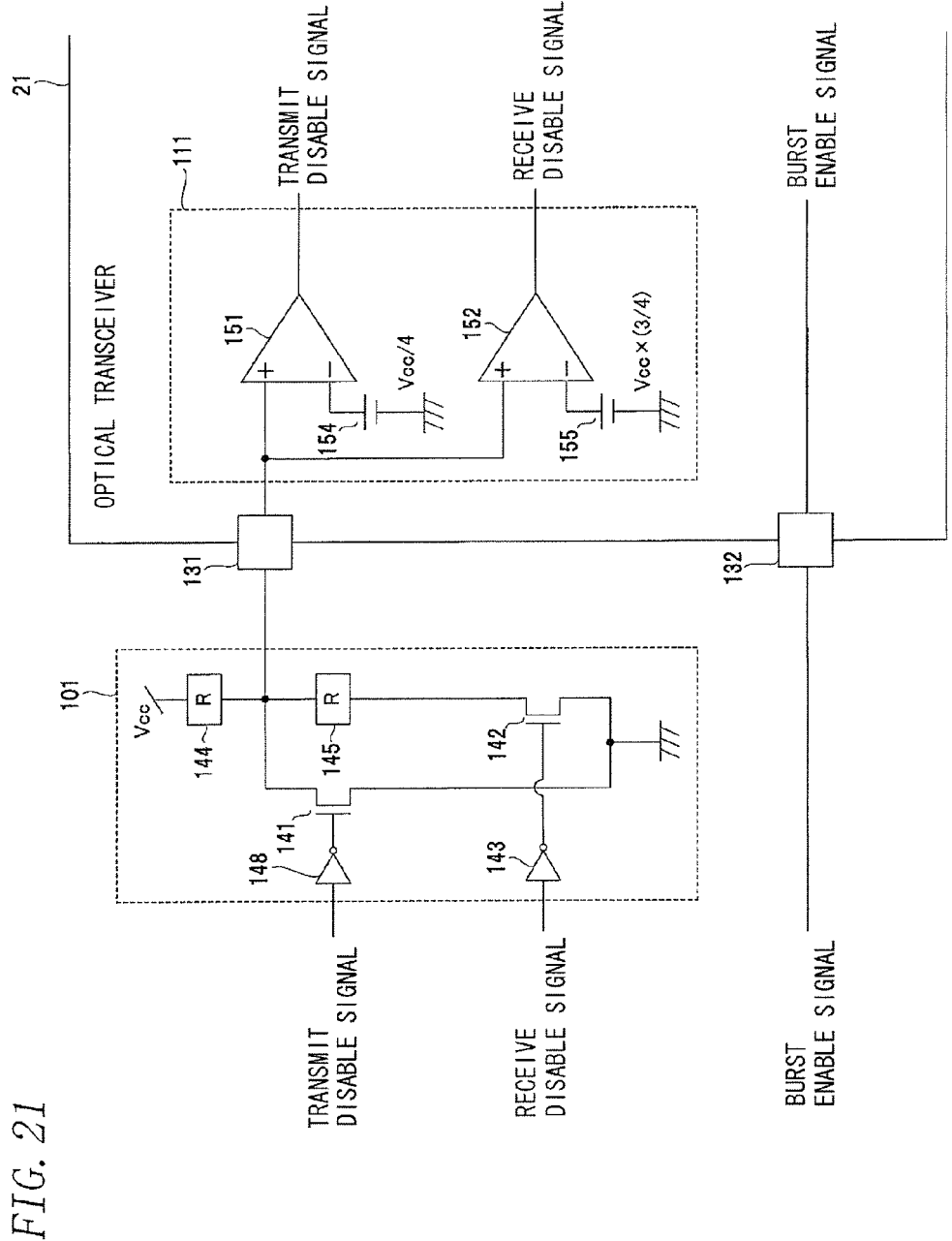
FIG. 21 is a diagram showing a configuration of transmission of control signals to the optical transceiver in the optical network unit according to the third embodiment of the present invention.

FIG. 21 is a diagram showing a configuration of transmission of control signals to an optical transceiver in an optical network unit according to a third embodiment of the present invention.

Referring to FIG. 21, an optical network unit 202 further includes an instructing unit 101. The instructing unit 101 includes N-channel MOS transistors 141 and 142, inverters 143 and 148, and resistors 144 and 145. An optical transceiver 21 further includes control terminals 131 and 132 and a determining unit 111. The determining unit 111 includes operational amplifiers 151 and 152 and constant voltage sources 154 and 155.

The instructing unit 101 converts the control contents of a plurality of control signals, i.e., a transmit disable signal and a receive disable signal, which are generated by a control unit 29 into one of a transmission/reception-off state, a transmission-off state, and a transmission standby state or a transmission/reception-on state, and outputs a voltage with a magnitude corresponding to the converted state to the control terminal 131 of the optical transceiver 21, as operation instruction information. Namely, the control terminal 131 receives the voltage as operation instruction information indicating in which one of the above-described states operation is to be performed.

The determining unit 111 determines one of the above-described states that is indicated by the operation instruction information, based on the magnitude of the voltage received by the control terminal 131.

In addition, the optical transceiver 21 receives a burst enable signal from the control unit 29 via the control terminal 132.

A burst transmitting unit 31 and a burst receiving unit 32 in the optical transceiver 21 operate in the one of the above-described states determined by the determining unit 111. More specifically, the burst transmitting unit 31 and the burst receiving unit 32 operate in one of the above-described states that is based on the determination result obtained by the determining unit 111 and the burst enable signal received via the control terminal 132.

More specifically, in the instructing unit 101, the resistor 144 has a first end connected to a node to which a power supply voltage Vcc is supplied; and a second end connected to the control terminal 131 of the optical transceiver 21. The resistor 145 has a first end connected to the second end of the resistor 144; and a second end. The N-channel MOS transistor 141 has a gate that receives, via the inverter 148, a transmit disable signal transmitted from the control unit 29; a drain connected to the control terminal 131 of the optical transceiver 21; and a source connected to a ground node to which a ground voltage is supplied. The N-channel MOS transistor 142 has a gate that receives, via the inverter 143, a receive disable signal transmitted from the control unit 29; a drain connected to the second end of the resistor 145; and a source connected to the ground node to which a ground voltage is supplied. The inverter 148 inverts the logic level of the transmit disable signal received from the control unit 29 and outputs the transmit disable signal. The inverter 143 inverts the logic level of the receive disable signal received from the control unit 29 and outputs the receive disable signal. Here, the resistance values of the resistors 144 and 145 are R. The power supply voltage Vcc is smaller in the absolute value of voltage level than, for example, power supply voltages Vdd1 and Vdd2.

In the determining unit 111, the operational amplifier 151 has a non-inverting input terminal connected to the control terminal 131; an inverting input terminal that receives a voltage of Vcc/4 from the constant voltage source 154; and an output terminal. The operational amplifier 152 has a non-inverting input terminal connected to the control terminal 131; an inverting input terminal that receives a voltage of (Vcc×¾) from the constant voltage source 155; and an output terminal.

The operational amplifier 151 outputs, as a transmit disable signal, a logic high level signal when the voltage at the non-inverting input terminal is higher than the voltage at the inverting input terminal, and outputs, as a transmit disable signal, a logic low level signal when the voltage at the non-inverting input terminal is lower than the voltage at the inverting input terminal.

The operational amplifier 152 outputs, as a receive disable signal, a logic high level signal when the voltage at the non-inverting input terminal is higher than the voltage at the inverting input terminal, and outputs, as a receive disable signal, a logic low level signal when the voltage at the non-inverting input terminal is lower than the voltage at the inverting input terminal.

FIG. 22 is a diagram showing the relationship of the logic levels of the control signals to the optical transceiver, the voltage at the control terminal, and the operating state of the optical transceiver, for the optical network unit according to the third embodiment of the present invention.

Referring to FIG. 22, when the transmit disable signal is at a logic high level and the receive disable signal is at a logic high level, the N-channel MOS transistors 141 and 142 are turned off. By this, the voltage at the control terminal 131 reaches Vcc.

At this time, in the determining unit 111, a transmit disable signal of a logic high level is outputted from the operational amplifier 151 and a receive disable signal of a logic high level is outputted from the operational amplifier 152. When the burst enable signal is at a logic low level, then the optical transceiver 21 is placed in a transmission/reception-off state.

When the transmit disable signal is at a logic high level and the receive disable signal is at a logic low level, the N-channel MOS transistor 141 is turned off and the N-channel MOS transistor 142 is turned on. By this, the voltage at the control terminal 131 reaches Vcc/2.

At this time, in the determining unit 111, a transmit disable signal of a logic high level is outputted from the operational amplifier 151 and a receive disable signal of a logic low level is outputted from the operational amplifier 152. When the burst enable signal is at a logic low level, then the optical transceiver 21 is placed in a transmission-off state.

When the transmit disable signal is at a logic low level and the receive disable signal is at a logic low level, the N-channel MOS transistor 141 is turned on and the N-channel MOS transistor 142 is turned on. By this, the voltage at the control terminal 131 reaches zero.

At this time, in the determining unit 111, a transmit disable signal of a logic low level is outputted from the operational amplifier 151 and a receive disable signal of a logic low level is outputted from the operational amplifier 152. By this, the optical transceiver 21 is placed in a transmission/reception-on state or a transmission standby state. When the burst enable signal is at a logic high level, then the optical transceiver 21 is placed in a transmission/reception-on state. When the burst enable signal is at a logic low level, then the optical transceiver 21 is placed in a transmission standby state.

When the transmit disable signal is at a logic low level and the receive disable signal is at a logic high level, the voltage at the control terminal 131 reaches zero, as in the case in which the transmit disable signal is at a logic low level and the receive disable signal is at a logic low level. However, in a PON system 301, the control signals are not placed in such a state and thus it is unavailable operation. In addition, of the states in which the burst enable signal goes to a logic high level, in those states other than that described above, in the PON system 301, it is unavailable operation.

Namely, in the optical network unit according to the third embodiment of the present invention, by treating these states as unavailable operation, a reduction in the number of terminals is achieved.

As such, the instructing unit 101 outputs, as operation instruction information indicating the transmission-off state, Vcc/2 which is an intermediate voltage between a ground voltage outputted to the optical transceiver 21 as operation instruction information indicating the transmission/reception-off state and a voltage Vcc outputted to the optical transceiver 21 as operation instruction information indicating the transmission standby state or the transmission/reception-on state, to the optical transceiver 21.

Namely, the voltage received by the control terminal 131 as operation instruction information indicating the transmission-off state is an intermediate voltage between a voltage received by the control terminal 131 as operation instruction information indicating the transmission/reception-off state and a voltage received by the control terminal 131 as operation instruction information indicating the transmission standby state or the transmission/reception-on state.

Figure 23:
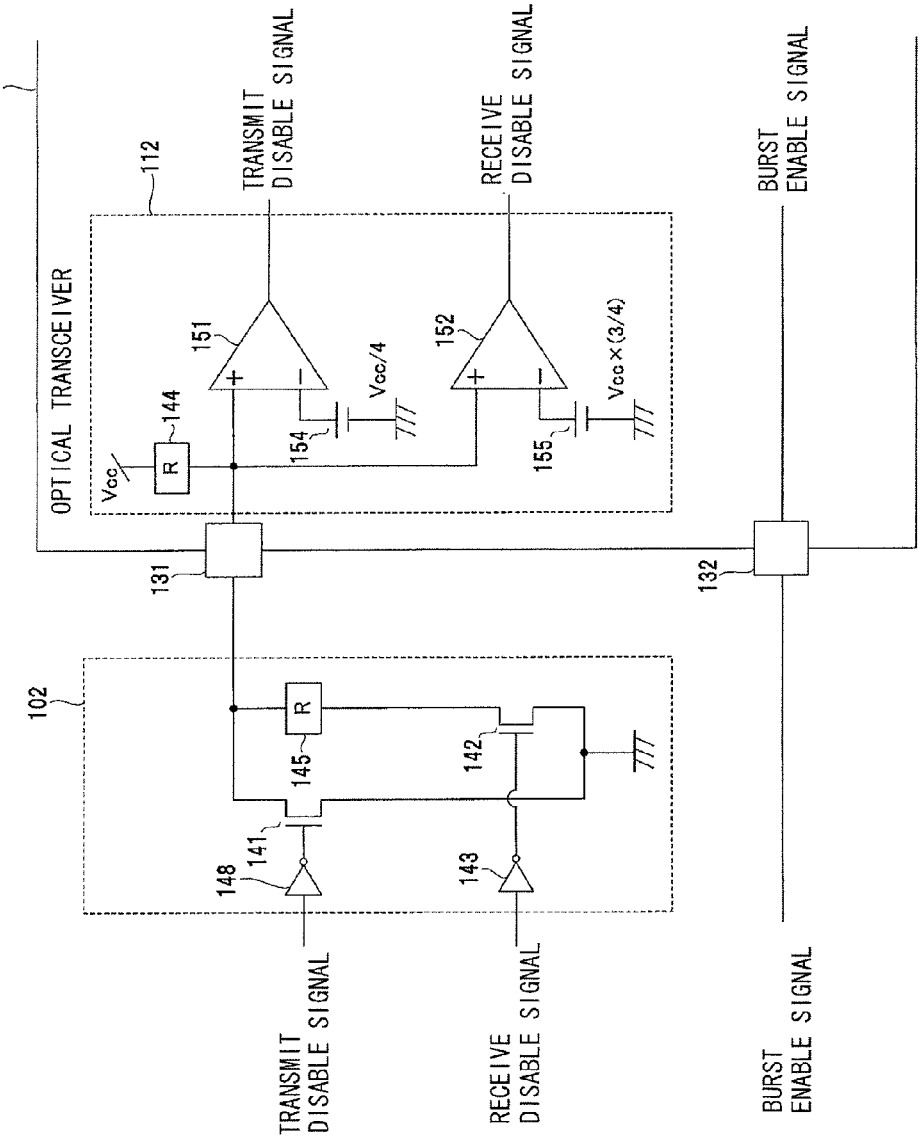
FIG. 23 is a diagram showing a variant of the configuration of transmission of control signals to the optical transceiver in the optical network unit according to the third embodiment of the present invention.

FIG. 23 is a diagram showing a variant of the configuration of transmission of control signals to the optical transceiver in the optical network unit according to the third embodiment of the present invention. Details other than those described below are the same as those of the configuration shown in FIG. 21.

Referring to FIG. 23, the optical network unit 202 includes an instructing unit 102 instead of the instructing unit 101. The instructing unit 102 includes N-channel MOS transistors 141 and 142, inverters 143 and 148, and a resistor 145. The optical transceiver 21 includes a determining unit 112 instead of the determining unit 111. The determining unit 112 includes a resistor 144, operational amplifiers 151 and 152, and constant voltage sources 154 and 155.

In the instructing unit 102, the resistor 145 has a first end connected to the control terminal 131 of the optical transceiver 21; and a second end connected to a drain of the N-channel MOS transistor 142.

In the determining unit 112, the resistor 144 has a first end connected to a node to which a power supply voltage Vcc is supplied; and a second end connected to the control terminal 131 of the optical transceiver 21.

In the variant, the instructing unit 102 converts the control contents of a plurality of control signals, i.e., a transmit disable signal and a receive disable signal, which are generated by the control unit 29 into one of the transmission/ reception-off state, the transmission-off state, and the transmission standby state or the transmission/reception-on state and outputs a current with a magnitude corresponding to the converted state to the control terminal 131 of the optical transceiver 21, as operation instruction information. Namely, the control terminal 131 receives the current as operation instruction information indicating in which one of the above-described states operation is to be performed.

The determining unit 112 determines one of the above-described states that is indicated by the operation instruction information, based on the magnitude of the current received by the control terminal 131.

The optical transceiver 21 receives a burst enable signal from the control unit 29 via the control terminal 132.

The burst transmitting unit 31 and the burst receiving unit 32 in the optical transceiver 21 operate in the one of the above-described states determined by the determining unit 112. More specifically, the burst transmitting unit 31 and the burst receiving unit 32 operate in one of the above-described states that is based on the determination result obtained by the determining unit 112 and the burst enable signal received via the control terminal 132.

Note that the relationship of the logic levels of the control signals to the optical transceiver, the voltage at the control terminal, and the operating state of the optical transceiver in the variant is the same as that in FIG. 22.

Specifically, the instructing unit 102 outputs, as operation instruction information indicating the transmission-off state, an intermediate current between a current outputted to the optical transceiver as operation instruction information indicating the transmission/reception-off state and a current outputted to the optical transceiver 21 as operation instruction information indicating the transmission standby state or the transmission/reception-on state, to the optical transceiver 21.

In other words, the current received by the control terminal 131 as operation instruction information indicating the transmission-off state is an intermediate current between a current received by the control terminal 131 as operation instruction information indicating the transmission/reception-off state and a current received by the control terminal 131 as operation instruction information indicating the transmission standby state or the transmission/reception-on state.

Figure 24:
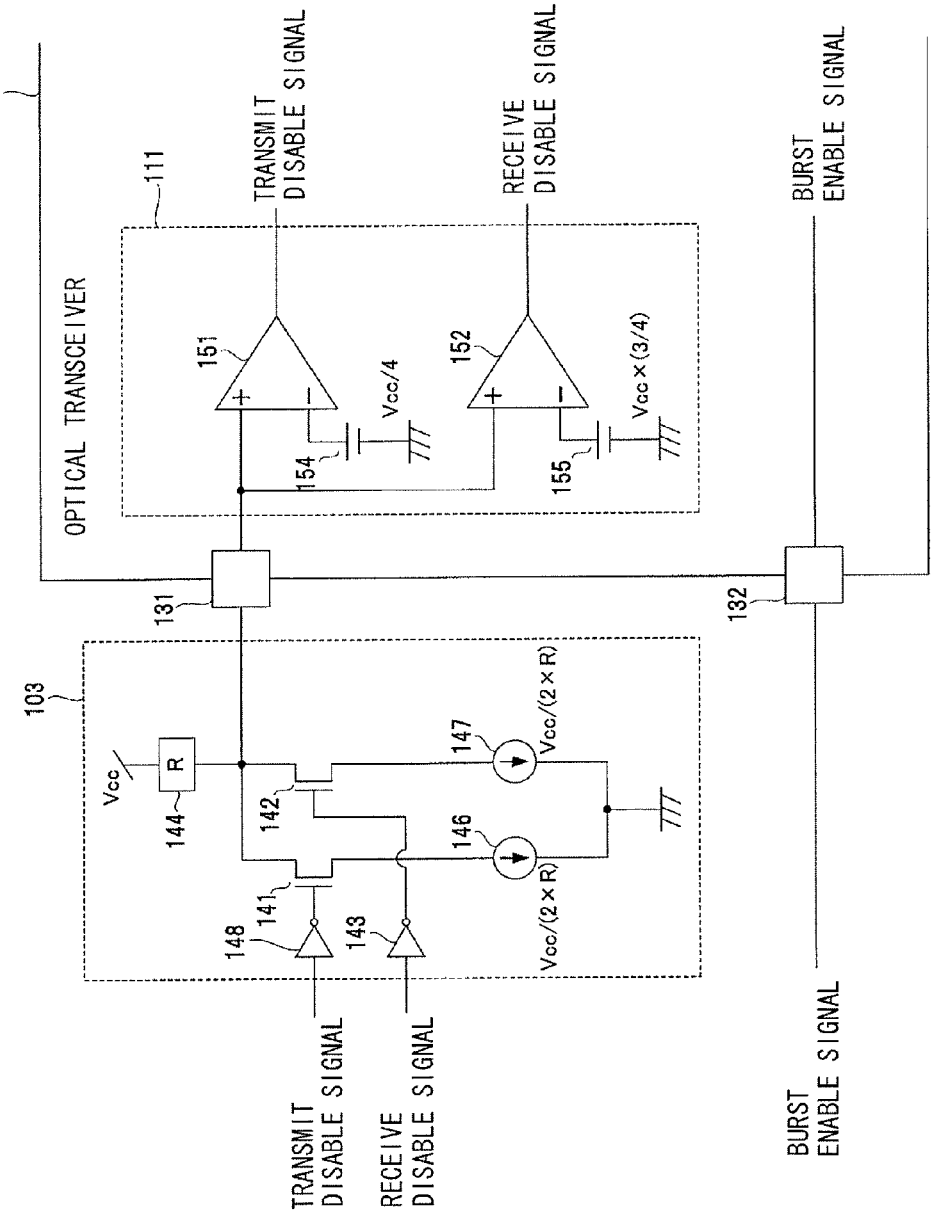
FIG. 24 is a diagram showing a variant of the configuration of transmission of control signals to the optical transceiver in the optical network unit according to the third embodiment of the present invention.

FIG. 24 is a diagram showing a variant of the configuration of transmission of control signals to the optical transceiver in the optical network unit according to the third embodiment of the present invention. Details other than those described below are the same as those of the configuration shown in FIG. 21.

Referring to FIG. 24, the optical network unit 202 includes an instructing unit 103 instead of the instructing unit 101. The instructing unit 103 includes N-channel MOS transistors 141 and 142, inverters 143 and 148, a resistor 144, and constant current sources 146 and 147.

In the instructing unit 103, the resistor 144 has a first end connected to a node to which a power supply voltage Vcc is supplied; and a second end connected to the control terminal 131 of the optical transceiver 21. The N-channel MOS transistor 141 has a gate that receives, via the inverter 148, a transmit disable signal transmitted from the control unit 29; a drain connected to the control terminal 131 of the optical transceiver 21; and a source connected to a first end of the constant current source 146. The N-channel MOS transistor 142 has a gate that receives, via the inverter 143, a receive disable signal transmitted from the control unit 29; a drain connected to the control terminal 131 of the optical transceiver 21; and a source connected to a first end of the constant current source 147. Second ends of the constant current sources 146 and 147 are connected to a ground node to which a ground voltage is supplied. The inverter 148 inverts the logic level of the transmit disable signal received from the control unit 29 and outputs the transmit disable signal. The inverter 143 inverts the logic level of the receive disable signal received from the control unit 29 and outputs the receive disable signal. Here, the constant current sources 146 and 147 each output a current of Vcc/(2×R).

FIG. 25 is a diagram showing the relationship of the logic levels of the control signals to the optical transceiver, the voltage at the control terminal, and the operating state of the optical transceiver in the variant shown in FIG. 24.

Referring to FIG. 25, when the transmit disable signal is at a logic high level and the receive disable signal is at a logic high level, the N-channel MOS transistors 141 and 142 are turned off. By this, the voltage at the control terminal 131 reaches Vcc.

At this time, in the determining unit 111, a transmit disable signal of a logic high level is outputted from the operational amplifier 151 and a receive disable signal of a logic high level is outputted from the operational amplifier 152. When the burst enable signal is at a logic low level, then the optical transceiver 21 is placed in a transmission/reception-off state.

When the transmit disable signal is at a logic high level and the receive disable signal is at a logic low level, the N-channel MOS transistor 141 is turned off and the N-channel MOS transistor 142 is turned on, whereby the constant current source 147 outputs a current. By this, the voltage at the control terminal 131 reaches Vcc/2.

At this time, in the determining unit 111, a transmit disable signal of a logic high level is outputted from the operational amplifier 151 and a receive disable signal of a logic low level is outputted from the operational amplifier 152. When the burst enable signal is at a logic low level, then the optical transceiver 21 is placed in a transmission-off state.

When the transmit disable signal is at a logic low level and the receive disable signal is at a logic low level, the N-channel MOS transistor 141 is turned on, whereby the constant current source 146 outputs a current, and the N-channel MOS transistor 142 is turned on, whereby the constant current source 147 outputs a current. By this, the voltage at the control terminal 131 reaches zero.

At this time, in the determining unit 111, a transmit disable signal of a logic low level is outputted from the operational amplifier 151 and a receive disable signal of a logic low level is outputted from the operational amplifier 152. By this, the optical transceiver 21 is placed in a transmission/reception-on state or a transmission standby state. When the burst enable signal is at a logic high level, then, the optical transceiver 21 is placed in a transmission/reception-on state. Alternatively, when the burst enable signal is at a logic low level, then the optical transceiver 21 is placed in a transmission standby state.

When the transmit disable signal is at a logic low level and the receive disable signal is at a logic high level, the voltage at the control terminal 131 reaches Vcc/2, as in the case in which the transmit disable signal is at a logic high level and the receive disable signal is at a logic low level. However, in the PON system 301, the control signals are not placed in such a state and thus it is unavailable operation. In addition, of the states in which the burst enable signal goes to a logic high level, in those states other than that described above, in the PON system 301, it is unavailable operation.

Note that in the configuration shown in FIG. 24, too, as with the configuration shown in FIG. 23, the resistor 144 can be provided on the side of the optical transceiver 21.

Figure 26:
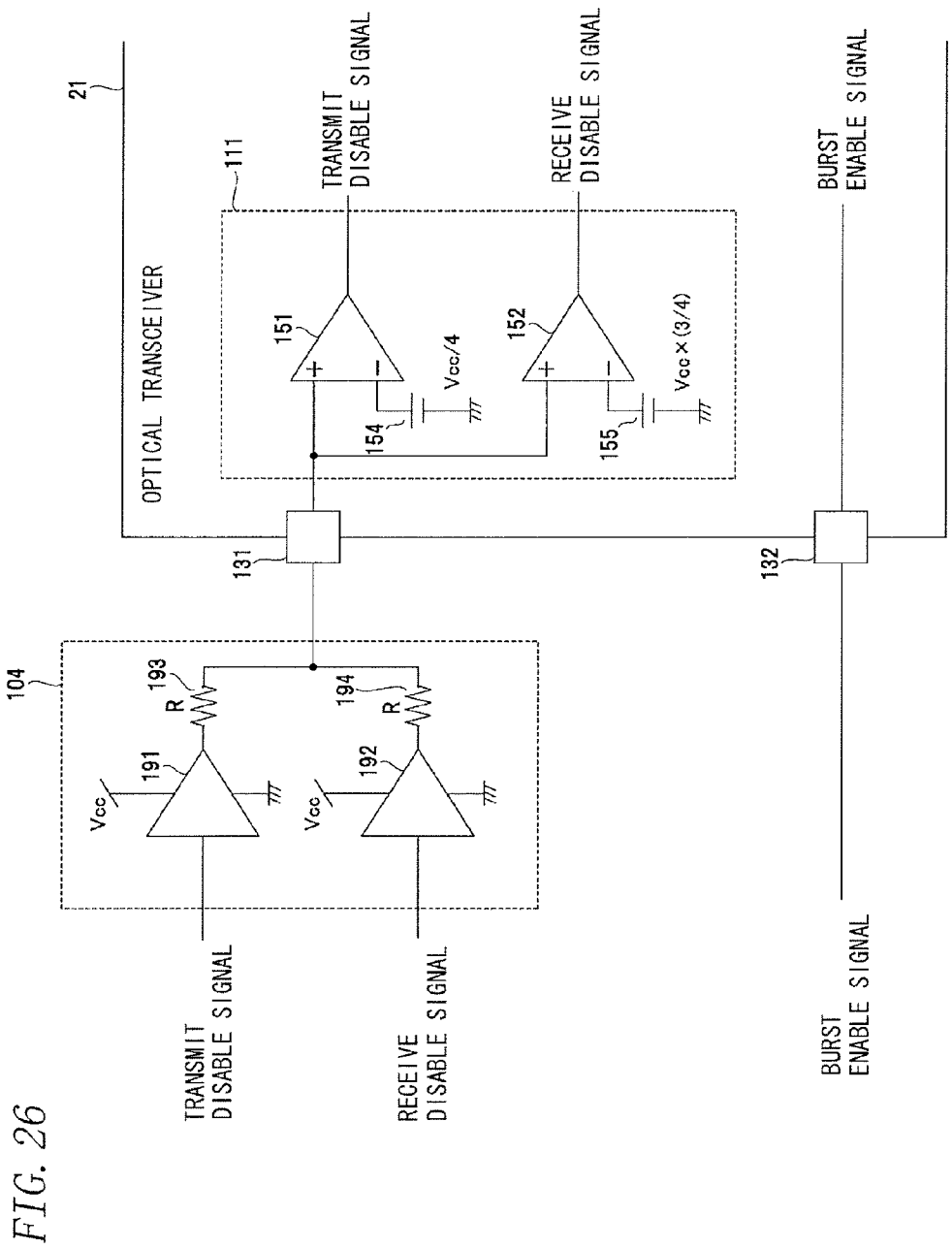
FIG. 26 is a diagram showing a variant of the configuration of transmission of control signals to the optical transceiver in the optical network unit according to the third embodiment of the present invention.

FIG. 26 is a diagram showing a variant of the configuration of transmission of control signals to the optical transceiver in the optical network unit according to the third embodiment of the present invention. Details other than those described below are the same as those of the configuration shown in FIG. 21.

Referring to FIG. 26, the optical network unit 202 includes an instructing unit 104 instead of the instructing unit 101. The instructing unit 104 includes buffers 191 and 192 and resistors 193 and 194.

The resistor 193 has a first end connected to an output terminal of the buffer 191; and a second end connected to the control terminal 131. The resistor 194 has a first end connected to an output terminal of the buffer 192; and a second end connected to the control terminal 131.

The buffers 191 and 192 are, for example, CMOS (Complementary Metal Oxide Semiconductor) push-pull buffers. Here, the resistance values of the resistors 193 and 194 are R.

The buffer 191 receives a transmit disable signal from the control unit 29. The buffer 192 receives a receive disable signal from the control unit 29.

FIG. 27 is a diagram showing the relationship of the logic levels of the control signals to the optical transceiver, the voltage at the control terminal, and the operating state of the optical transceiver in the variant shown in FIG. 26.

Referring to FIG. 27, when the transmit disable signal is at a logic high level and the receive disable signal is at a logic high level, the output from the buffer 191 goes to a logic high level and the output from the buffer 192 goes to a logic high level. By this, the voltage at the control terminal 131 reaches Vcc.

At this time, in the determining unit 111, a transmit disable signal of a logic high level is outputted from the operational amplifier 151, and a receive disable signal of a logic high level is outputted from the operational amplifier 152. When the burst enable signal is at a logic low level, then the optical transceiver 21 is placed in a transmission/reception-off state.

When the transmit disable signal is at a logic high level and the receive disable signal is at a logic low level, the output from the buffer 191 goes to a logic high level and the output from the buffer 192 goes to a logic low level. By this, the voltage at the control terminal 131 reaches Vcc/2.

At this time, in the determining unit 111, a transmit disable signal of a logic high level is outputted from the operational amplifier 151, and a receive disable signal of a logic low level is outputted from the operational amplifier 152. When the burst enable signal is at a logic low level, then the optical transceiver 21 is placed in a transmission-off state.

When the transmit disable signal is at a logic low level and the receive disable signal is at a logic low level, the output from the buffer 191 goes to a logic low level and the output from the buffer 192 goes to a logic low level. By this, the voltage at the control terminal 131 reaches zero.

At this time, in the determining unit 111, a transmit disable signal of a logic low level is outputted from the operational amplifier 151, and a receive disable signal of a logic low level is outputted from the operational amplifier 152. By this, the optical transceiver 21 is placed in a transmission/reception-on state or a transmission standby state. When the burst enable signal is at a logic high level, then the optical transceiver 21 is placed in a transmission/reception-on state. Alternatively, when the burst enable signal is at a logic low level, then the optical transceiver 21 is placed in a transmission standby state.

When the transmit disable signal is at a logic low level and the receive disable signal is at a logic high level, the voltage at the control terminal 131 reaches Vcc/2, as in the case in which the transmit disable signal is at a logic high level and the receive disable signal is at a logic low level. However, in the PON system 301, the control signals are not placed in such a state and thus it is unavailable operation. In addition, of the states in which the burst enable signal goes to a logic high level, in those states other than that described above, in the PON system 301, it is unavailable operation.

As such, by the configuration using CMOS push-pull buffers, for example, the responsivity upon turn-off can be increased, compared to the configuration using N-channel MOS transistors such as that shown in FIG. 21, etc.

Other configurations and operation are the same as those in a PON system according to the second embodiment, and thus, detailed description thereof is not repeated here.

Figure 28:
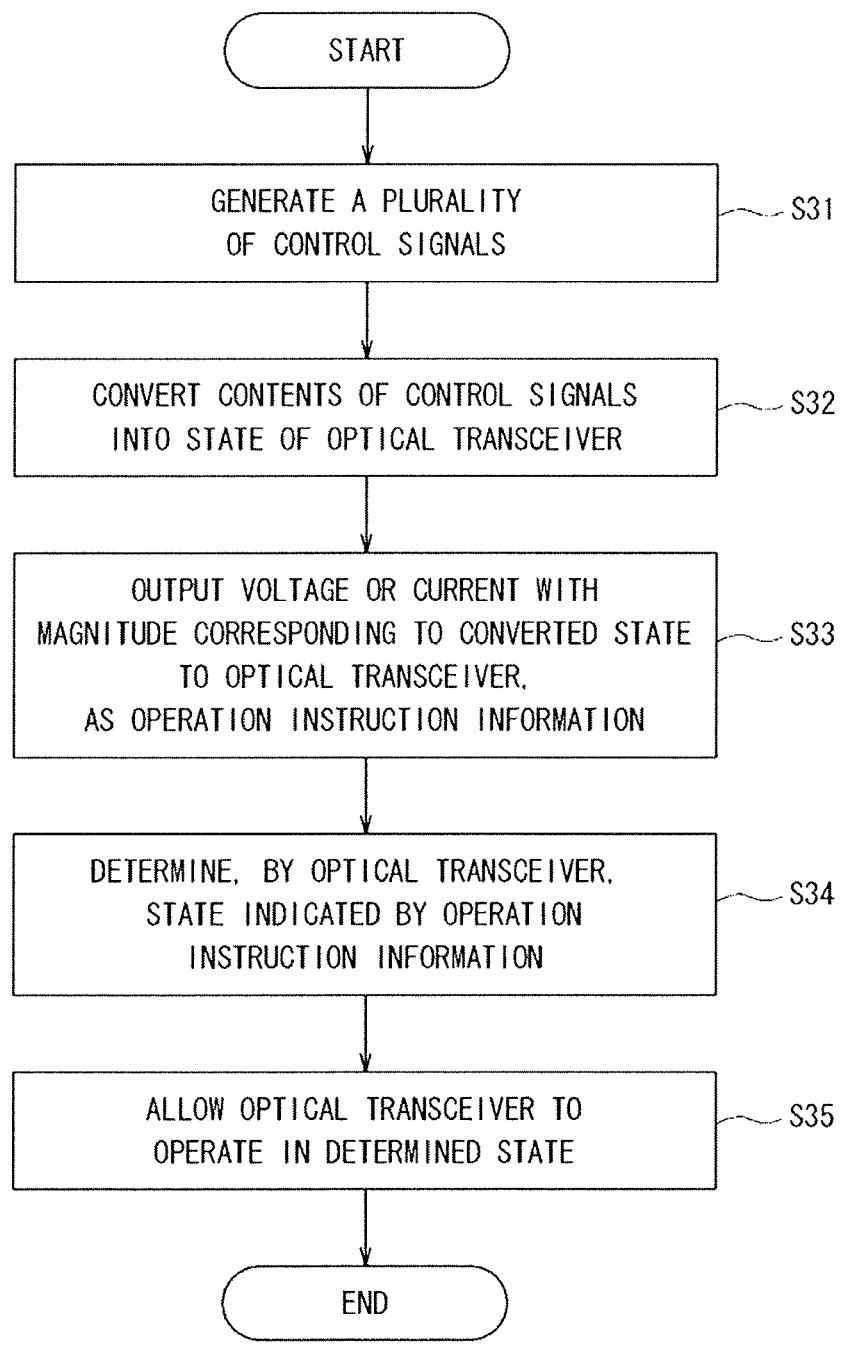
FIG. 28 is a flowchart defining an operation procedure for when each of the optical network units according to the first to third embodiments of the present invention controls its optical transceiver.

FIG. 28 is a flowchart defining an operation procedure for when each of the optical network units according to the first to third embodiments of the present invention controls its optical transceiver.

Referring to FIG. 28, first, the control unit 29 generates a plurality of control signals that control in which one of the states of the optical transceiver 21 the optical transceiver 21 is allowed to operate (step S31).

Then, the instructing unit on the main body side of the optical network unit 202 converts the control contents of the plurality of generated control signals into one of the above-described states (step S32).

Then, the instructing unit on the main body side of the optical network unit 202 outputs a voltage or current with a magnitude corresponding to the converted state to the optical transceiver 21, as operation instruction information (step S33).

Then, the determining unit in the optical transceiver 21 determines one of the above-described states that is indicated by the operation instruction information, based on the magnitude of the voltage or current received as operation instruction information (step S34).

Then, the burst transmitting unit 31 or the burst receiving unit 32 in the optical transceiver 21 operates in the determined one of the above-described states (step S35).

As described above, in the optical transceiver according to the third embodiment of the present invention, the burst transmitting unit 31 and the burst receiving unit 32 are operable in three or more states for transmission or reception of optical signals, and the states transition in sequence. The control terminal 131 receives a voltage or current as operation instruction information indicating in which one of the states operation is to be performed. The determining unit 111 determines one of the states that is indicated by the operation instruction information, based on the magnitude of the voltage or current received by the control terminal 131. Then, the burst transmitting unit 31 and the burst receiving unit 32 operate in the one of the states determined by the determining unit 111.

In addition, in the optical network unit according to the third embodiment of the present invention, the control unit 29 generates a plurality of control signals that control in which one of the above-described states the optical transceiver 21 is allowed to operate. The instructing unit 101 converts the control contents of the plurality of control signals generated by the control unit 29, into one of the above-described states, and outputs a voltage or current with a magnitude corresponding to the converted state to the optical transceiver 21, as operation instruction information.

Specifically, for example, after encoding a plurality of binary control signals into a single ternary control signal, the ternary control signal is outputted to a control target, i.e., the optical transceiver. Then, the encoded control signal is decoded by the optical transceiver 21 into a plurality of binary control signals.

By such a configuration, for example, when the operating state of an optical transceiver operable in four states is controlled by three binary control signals, terminals for providing two of the control signals to the optical transceiver can be integrated into one. Namely, the optical transceiver can be controlled using a plurality of control signals, and a reduction in the number of terminals of the optical transceiver can be achieved. In addition, by a configuration in which the remaining one of the three control signals is provided to the optical transceiver via another terminal, a control signal that needs to operate at a high speed can be provided to the optical transceiver without encoding or decoding the control signal.

Therefore, in the optical transceiver according to the third embodiment of the present invention, the operating state of the optical transceiver can be controlled and a reduction in the number of terminals of the optical transceiver can be achieved. In addition, since it does not take time to decode control signals, a reduction in the response rate of the optical transceiver 21 can be prevented.

In addition, in the optical network unit according to the third embodiment of the present invention, the burst transmitting unit 31 and the burst receiving unit 32 in the optical transceiver 21 are operable in a transmission/reception-off state in which the transmission operation and reception operation of optical signals are stopped; a transmission-off state in which the transmission operation of optical signals is stopped and the reception operation of optical signals is performed; a transmission standby state in which transmission of optical signals is prepared and the reception operation of optical signals is performed; and a transmission/reception-on state in which the transmission operation and reception operation of optical signals are performed. The transmission/reception-off state, the transmission-off state, the transmission standby state, and the transmission/reception-on state transition in sequence.

By such a configuration, a transition of four states of the transmitting unit and the receiving unit in the optical transceiver 21 can be controlled. More specifically, operation instructions for the transmission/reception-off state, the transmission-off state, and the transmission standby state or the transmission/reception-on state are transmitted by the instructing unit 101 and the determining unit 111 via one terminal. Then, another control signal, i.e., a burst enable signal, is transmitted via another terminal to switch between the transmission standby state and the transmission/reception-on state. By this, the upstream frame transmission intervals of each optical network unit 202 can be set to be shorter and the power saving operation of each optical network unit 202 can be minutely set. Therefore, power saving of the optical transceiver can be achieved using a plurality of control signals, and a reduction in the number of terminals of the optical transceiver can be achieved.

In addition, in the optical transceiver according to the third embodiment of the present invention, in the transmission/reception-off state, a bias circuit 68 stops power supply to a light-emitting circuit 75, power sources 64 to 66 stop power supply to a transmission modulation circuit 74, and power sources 88 to 90 stop power supply to a light-receiving circuit. In the transmission-off state, the bias circuit 68 stops power supply to the light-emitting circuit 75, the power sources 64 to 66 stop power supply to the transmission modulation circuit 74, and the power sources 88 to 90 supply power to the light-receiving circuit. In the transmission standby state, the bias circuit 68 stops power supply to the light-emitting circuit 75, the power sources 64 to 66 supply power to the transmission modulation circuit 74, and the power sources 88 to 90 supply power to the light-receiving circuit. In the transmission/reception-on state, the bias circuit 68 supplies power to the light-emitting circuit 75, the power sources 64 to 66 supply power to the transmission modulation circuit 74, and the power sources 88 to 90 supply power to the light-receiving circuit.

By such a configuration, a reduction in the number of terminals of the optical transceiver can be achieved and power saving control of each circuit in the burst transmitting unit 31 and the burst receiving unit 32 in the optical transceiver 21 can be appropriately performed.

In addition, in the optical network unit according to the third embodiment of the present invention, the transmission/reception-off state, the transmission-off state, the transmission standby state, and the transmission/reception-on state transition in sequence in this order and in both directions. The instructing unit 101 outputs, as operation instruction information indicating the transmission-off state, an intermediate voltage between voltages outputted to the optical transceiver 21 as operation instruction information indicating the transmission/reception-off state and the transmission standby state or the transmission/reception-on state, to the optical transceiver 21. Alternatively, the instructing unit 101 outputs, as operation instruction information indicating the transmission-off state, an intermediate current between currents outputted to the optical transceiver 21 as operation instruction information indicating the transmission/reception-off state and the transmission standby state or the transmission/reception-on state, to the optical transceiver 21.

In addition, in the optical transceiver according to the third embodiment of the present invention, the transmission/reception-off state, the transmission-off state, the transmission standby state, and the transmission/reception-on state transition in sequence in this order and in both directions. The voltage received by the control terminal 131 as operation instruction information indicating the transmission-off state is an intermediate voltage between voltages received by the control terminal 131 as operation instruction information indicating the transmission/reception-off state and the transmission standby state or the transmission/reception-on state. Alternatively, the current received by the control terminal 131 as operation instruction information indicating the transmission-off state is an intermediate current between currents received by the control terminal 131 as operation instruction information indicating the transmission/reception-off state and the transmission standby state or the transmission/reception-on state.

By such a configuration, the amount of change in voltage or current received by the optical transceiver 21 as operation instruction information, which results from a state transition of the optical transceiver 21 can be reduced, enabling to improve the response rate of the optical transceiver 21.

Note that although the optical network units according to the first to third embodiments of the present invention are configured such that the control unit generates control signals and the instructing unit converts the control contents of the control signals into one of the states of the optical transceiver 21, and outputs a voltage or current with a magnitude corresponding to the converted state to the optical transceiver 21, as operation instruction information, the configuration is not limited thereto. The configuration is not limited to the one in which control signals are generated and converted, and can be any as long as a voltage or current with a magnitude corresponding to each state of the optical transceiver 21 is outputted to the optical transceiver 21, as operation instruction information.

Note also that although the optical network units according to the first to third embodiments of the present invention are configured such that the optical transceiver 21 is operable in three or more states for transmission or reception of optical signals and the states transition in sequence, the configuration is not limited thereto. The optical transceiver 21 may be configured such that the optical transceiver 21 has an operating state that does not transition in sequence, in addition to the above-described states.

Namely, the optical network units 202 have three or more states for transmission or reception of optical signals that transition in sequence, and have pieces of operation instruction information with which the above-described states are associated in the magnitude of a voltage or current such that the transition in sequence exhibits an increase or decrease in voltage or current. The control unit determines in which state the optical transceiver 21 is allowed to operate. Then, the instructing unit converts the state determined by the control unit into operation instruction information and provides the operation instruction information to the optical transceiver 21.

Even by such a configuration, the operating state of the optical transceiver can be controlled and a reduction in the number of terminals of the optical transceiver can be achieved. In addition, since it does not take time to decode control signals, a reduction in the response rate of the optical transceiver can be prevented.

The above-described embodiments are to be considered in all respects as illustrative and not restrictive. The scope of the present invention is indicated by the appended claims, rather than the foregoing description, and is intended to include all changes which come within the meanings and range of equivalency of the claims.

REFERENCE SIGNS LIST 11, 14, 16, 17, 19, 96, 101, 102, 103, and 104: INSTRUCTING UNIT
12, 131, and 132: CONTROL TERMINAL
13, 15, 18, 20, 111, and 112: DETERMINING UNIT
21: OPTICAL TRANSCEIVER
22: PON RECEPTION PROCESSING UNIT
23: BUFFER MEMORY
24: UN TRANSMISSION PROCESSING UNIT
25: UNI PORT
26: UN RECEPTION PROCESSING UNIT
27: BUFFER MEMORY
28: PON TRANSMISSION PROCESSING UNIT
29: CONTROL UNIT
31: BURST TRANSMITTING UNIT
32: BURST RECEIVING UNIT
41, 42, 48, 141, and 142: N-CHANNEL MOS TRANSISTOR
43, 49, 53, 95, 143, and 148: INVERTER
44, 45, 50, 93, 94, 144, 145, 193, and 194: RESISTOR
51, 52, 56, 151, and 152: OPERATIONAL AMPLIFIER
54, 55, 57, 154, and 155: CONSTANT VOLTAGE SOURCE
40, 46, 47, 146, and 147: CONSTANT CURRENT SOURCE
61: PREBUFFER CIRCUIT
62: EQUALIZER CIRCUIT
63: OUTPUT BUFFER CIRCUIT
64 to 66: POWER SOURCE
68: BIAS CIRCUIT
69: MASTER I/F
70: CPU
71: SLAVE I/F
72: CONTROL REGISTER
73: MEMORY UNIT
74: TRANSMISSION MODULATION CIRCUIT
75: LIGHT-EMITTING CIRCUIT
91, 92, 191, and 192: BUFFER
201: OPTICAL LINE TERMINAL
202A, 202B, 202C, and 202D: OPTICAL NETWORK UNIT
301: PON SYSTEM
C1 and C2: CAPACITOR
SP1 and SP2: SPLITTER
OPTF: OPTICAL FIBER
L1 and L2: INDUCTOR
LD: LIGHT-EMITTING DEVICE

The invention claimed is:

1. An optical transceiver acting as a transmitting and receiving unit that transmits and receives optical signals and that has three or more states for transmission or reception of the optical signals in correspondence with a combination of two or more control signals, the states transitioning in sequence, the transmitting and receiving unit using a voltage or current with a high value for a first state, a low value for a second state, and an intermediate value between the high value and the low value for an intermediate state of transition between the first state and the second state, each value serving as operation instruction information indicating which state is to be performed from among three states, the optical transceiver comprising:
 a terminal that is disposed on one electric path to receive the voltage or current with the high value, the intermediate value and the low value and the voltage or current continuously varying in any one way between the high value and the low value through the intermediate value; and
 a determining unit for determining one of the three or more states indicated by the operation instruction information, the determining unit obtaining the control signals by comparing an instantaneous value of the voltage or current received at the terminal with respective reference values corresponding to the control signals, wherein
 the transmitting and receiving unit operates in one of the states corresponding to the control signals obtained by the determining unit, and
 the transmitting and receiving unit is configured to make a state transition with a regularity defined by only two patterns of:
  a state transition from the first state to the second state via the intermediate state, and
  a state transition from the second state to the first state via the intermediate state.

2. The optical transceiver according to claim 1, wherein for transmission of the optical signals, the first state is a transmission-off state; the second state is a transmission-on state; and the intermediate state is a standby state.

3. The optical transceiver according to claim 2, wherein the transmitting and receiving unit includes:
a light-emitting circuit including a light-emitting device;
a modulation circuit for supplying a modulation current to the light-emitting device;
a first power source that supplies power to the light-emitting circuit and is capable of controlling start and stop of the power supply; and
a second power source that supplies power to the modulation circuit and is capable of controlling start and stop of the power supply, wherein
in the transmission-off state, the first power source stops power supply to the light-emitting circuit and the second power source stops power supply to the modulation circuit,
in the transmission-on state, the first power source supplies power to the light-emitting circuit and the second power source supplies power to the modulation circuit, and
in the standby state, the first power source stops power supply to the light-emitting circuit and the second power source supplies power to the modulation circuit.

4. The optical transceiver according to claim 1, wherein in the transmitting and receiving unit, transition is caused in sequence defined by:
a transmission/reception-off state in which transmission operation and reception operation of the optical signals are stopped,
a transmission-off state in which transmission operation of the optical signals is stopped and reception operation of the optical signals is performed,
a transmission standby state in which transmission of the optical signals is prepared and reception operation of the optical signals is performed, and
a transmission/reception-on state in which transmission operation and reception operation of the optical signals are performed.

5. The optical transceiver according to claim 4, wherein the transmitting and receiving unit includes:
a light-emitting circuit including a light-emitting device;
a modulation circuit for supplying a modulation current to the light-emitting device;
a light-receiving circuit including a light-receiving device;
a first power source that supplies power to the light-emitting circuit and is capable of controlling start and stop of the power supply;
a second power source that supplies power to the modulation circuit and is capable of controlling start and stop of the power supply; and
a third power source that supplies power to the light-receiving circuit and is capable of controlling start and stop of the power supply, wherein
in the transmission/reception-off state, the first power source stops power supply to the light-emitting circuit, the second power source stops power supply to the modulation circuit, and the third power source stops power supply to the light-receiving circuit,
in the transmission-off state, the first power source stops power supply to the light-emitting circuit, the second power source stops power supply to the modulation circuit, and the third power source supplies power to the light-receiving circuit,
in the transmission standby state, the first power source stops power supply to the light-emitting circuit, the second power source supplies power to the modulation circuit, and the third power source supplies power to the light-receiving circuit, and
in the transmission/reception-on state, the first power source supplies power to the light-emitting circuit, the second power source supplies power to the modulation circuit, and the third power source supplies power to the light-receiving circuit.

6. The optical transceiver according to claim 4, wherein
a voltage received by the terminal as operation instruction information indicating the transmission-off state is an intermediate voltage between voltages received by the terminal as operation instruction information indicating the transmission/reception-off state and the transmission standby state or the transmission/reception-on state, or
a current received by the terminal as operation instruction information indicating the transmission-off state is an intermediate current between currents received by the terminal as operation instruction information indicating the transmission/reception-off state and the transmission standby state or the transmission/reception-on state.

7. An optical network unit for transmitting and receiving optical signals to/from an optical line terminal, wherein
the optical network unit has:
three or more states for transmission or reception of the optical signals in correspondence with a combination of two or more control signals, the states transitioning in sequence, three state including a first state, a second state and an intermediate state of transition between the first state and the second state; and
pieces of operation instruction information with which the first state, the second state and the intermediate state are associated with a high value, a low value and an intermediate value between the high value and the low value, respectively, of a voltage or current such that the transition in sequence exhibits an increase or decrease in voltage or current, and
the optical network unit comprises:
a control unit for determining in which one of the three states an optical transceiver is allowed to operate, the optical transceiver performing transmission and reception of the optical signals;
an instructing unit for converting the state determined by the control unit into operation instruction information and providing the operation instruction information to a terminal of the optical transceiver, the instructing unit being configured to make a state transition with a regularity defined by only two patterns of: a state transition from the first state to the second state via the intermediate state, and a state transition from the second state to the first state via the intermediate state, and
a determining unit for determining one of the three or more states indicated by the operation instruction information, the determining unit obtaining the control signals by comparing an instantaneous value of the voltage or current received at the terminal with respective reference values corresponding to the control signals, wherein
the terminal is disposed on one electric path to receive the voltage or current with the high value, the intermediate value and the low value and the voltage or current continuously varying in any one way between the high value and the low value through the intermediate value.

8. The optical network unit according to claim 7, wherein for transmission of the optical signals, the first state is a transmission-off state; the second state is a transmission-on state; and the intermediate state is a standby state.

9. The optical network unit according to claim 7, wherein transition is caused in sequence defined by:
a transmission/reception-off state in which transmission operation and reception operation of the optical signals are stopped,
a transmission-off state in which transmission operation of the optical signals is stopped and reception operation of the optical signals is performed,
a transmission standby state in which transmission of the optical signals is prepared and reception operation of the optical signals is performed, and
a transmission/reception-on state in which transmission operation and reception operation of the optical signals are performed.

10. The optical network unit according to claim 9, wherein
the transmission/reception-off state, the transmission-off state, the transmission standby state, and the transmission/reception-on state transition in sequence in this order and a reverse order, and
the instructing unit outputs:
as operation instruction information indicating the transmission-off state, an intermediate voltage between voltages outputted to the optical transceiver as operation instruction information indicating the transmission/reception-off state and the transmission standby state or the transmission/reception-on state, to the optical transceiver; or
as operation instruction information indicating the transmission-off state, an intermediate current between currents outputted to the optical transceiver as operation instruction information indicating the transmission/reception-off state and the transmission standby state or the transmission/reception-on state, to the optical transceiver.

11. An optical transceiver control method for an optical network unit that transmits and receives optical signals to/from an optical line terminal and that has three or more states for transmission or reception of the optical signals in correspondence with a combination of two or more control signals, the states transitioning in sequence, three state including a first state, a second state and an intermediate state of transition between the first state and the second state, wherein the optical network unit has pieces of operation instruction information with which the first state, the second state and the intermediate state are associated with a high value, a low value and an intermediate value between the high value and the low value, respectively, of a voltage or current such that the transition in sequence exhibits an increase or decrease in voltage or current, the method comprising the steps of:
determining in which one of the three states an optical transceiver is allowed to operate, the optical transceiver performing transmission and reception of the optical signals;
converting the determined state into operation instruction information and providing the optical transceiver with the voltage or current of the high value, the intermediate value and the low value and the voltage or current continuously varying in any one way between the high value and the low value through the intermediate value, via one electric path;
determining one of the three or more states indicated by the operation instruction information, also obtaining the control signals by comparing an instantaneous value of a voltage or current received by the optical transceiver as the operation instruction information with respective reference values corresponding to the control signals; and
allowing the optical transceiver to operate in one of the states corresponding to the control signals obtained, wherein
state transition is caused with a regularity defined by only two patterns of:
a state transition from the first state to the second state via the intermediate state, and
a state transition from the second state to the first state via the intermediate state.

12. The optical transceiver according to claim 5, wherein
a voltage received by the terminal as operation instruction information indicating the transmission-off state is an intermediate voltage between voltages received by the terminal as operation instruction information indicating the transmission/reception-off state and the transmission standby state or the transmission/reception-on state, or
a current received by the terminal as operation instruction information indicating the transmission-off state is an intermediate current between currents received by the terminal as operation instruction information indicating the transmission/reception-off state and the transmission standby state or the transmission/reception-on state.

* * * * *